US012058511B2

(12) United States Patent
Laitinen et al.

(10) Patent No.: US 12,058,511 B2
(45) Date of Patent: Aug. 6, 2024

(54) SOUND FIELD RELATED RENDERING

(71) Applicant: Nokia Technologies Oy, Espoo (FI)

(72) Inventors: Mikko-Ville Laitinen, Espoo (FI); Juha Vilkamo, Helsinki (FI); Lasse Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 224 days.

(21) Appl. No.: 17/593,705

(22) PCT Filed: Mar. 19, 2020

(86) PCT No.: PCT/FI2020/050174
§ 371 (c)(1),
(2) Date: Sep. 23, 2021

(87) PCT Pub. No.: WO2020/193852
PCT Pub. Date: Oct. 1, 2020

(65) Prior Publication Data

US 2022/0174443 A1 Jun. 2, 2022

(30) Foreign Application Priority Data

Mar. 27, 2019 (GB) ..................................... 1904261

(51) Int. Cl.
*H04S 7/00* (2006.01)
*G10L 19/008* (2013.01)
*H04S 3/00* (2006.01)

(52) U.S. Cl.
CPC .............. *H04S 7/30* (2013.01); *G10L 19/008* (2013.01); *H04S 3/008* (2013.01); *H04S 2400/01* (2013.01); *H04S 2400/03* (2013.01); *H04S 2420/03* (2013.01); *H04S 2420/11* (2013.01)

(58) Field of Classification Search
None
See application file for complete search history.

(56) References Cited

U.S. PATENT DOCUMENTS

2010/0174548 A1 7/2010 Beack et al. .................. 704/503
2011/0182432 A1 7/2011 Ishikawa et al. ............... 381/22
2014/0095179 A1 4/2014 Beack et al. ......................... 19/8
2015/0154965 A1 6/2015 Wuebbolt et al. .................. 19/8
2017/0110140 A1 4/2017 Peters et al. ...................... 19/20
2017/0162210 A1 6/2017 Cui et al.
2020/0228913 A1* 7/2020 Herre ...................... H04S 7/303
2022/0007126 A1* 1/2022 Bruhn .................... H04R 1/406

FOREIGN PATENT DOCUMENTS

CN 101276587 A 10/2008
CN 102768836 A 11/2012
CN 102982804 A 3/2013
CN 107925815 A 4/2018
CN 108269577 A 7/2018
JP 2018534617 A 11/2018
JP 2018198434 A 12/2018
WO WO 2014/125289 A1 8/2014
WO WO 2017/066312 A1 4/2017
WO WO-2018056780 A1 3/2018

* cited by examiner

*Primary Examiner* — Qin Zhu
(74) *Attorney, Agent, or Firm* — Harrington & Smith

(57) ABSTRACT

An apparatus including circuitry configured to: obtain at least two audio signals; determine a type of the at least two audio signals; process the at least two audio signals configured to be rendered based on the determined type of the at least two audio signals.

20 Claims, 17 Drawing Sheets

SOUND FIELD RELATED RENDERING

CROSS REFERENCE TO RELATED APPLICATION

This patent application is a U.S. National Stage application of International Patent Application Number PCT/FI2020/050174 filed Mar. 19, 2020, which is hereby incorporated by reference in its entirety, and claims priority to GB 1904261.3 filed Mar. 27, 2019.

FIELD

The present application relates to apparatus and methods for sound-field related audio representation and rendering, but not exclusively for audio representation for an audio decoder.

BACKGROUND

Immersive audio codecs are being implemented supporting a multitude of operating points ranging from a low bit rate operation to transparency. An example of such a codec is the Immersive Voice and Audio Services (IVAS) codec which is being designed to be suitable for use over a communications network such as a 3GPP 4G/5G network including use in such immersive services as for example immersive voice and audio for virtual reality (VR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

Input signals can be presented to the IVAS encoder in one of a number of supported formats (and in some allowed combinations of the formats). For example a mono audio signal (without metadata) may be encoded using an Enhanced Voice Service (EVS) encoder. Other input formats may utilize IVAS encoding tools. At least some inputs can utilize Metadata-assisted spatial audio (MASA) tools or any suitable spatial metadata based scheme. This is a parametric spatial audio format suitable for spatial audio processing. Parametric spatial audio processing is a field of audio signal processing where the spatial aspect of the sound (or sound scene) is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

For example, there can be two channels (stereo) of audio signals and spatial metadata. The spatial metadata may furthermore define parameters such as: Direction index, describing a direction of arrival of the sound at a time-frequency parameter interval; Direct-to-total energy ratio, describing an energy ratio for the direction index (i.e., time-frequency subframe); Spread coherence describing a spread of energy for the direction index (i.e., time-frequency subframe); Diffuse-to-total energy ratio, describing an energy ratio of non-directional sound over surrounding directions; Surround coherence describing a coherence of the non-directional sound over the surrounding directions; Remainder-to-total energy ratio, describing an energy ratio of the remainder (such as microphone noise) sound energy to fulfil requirement that sum of energy ratios is 1; and Distance, describing a distance of the sound originating from the direction index (i.e., time-frequency subframes) in meters on a logarithmic scale.

The IVAS stream can be decoded and rendered to a variety of output formats, including binaural, multichannel, and Ambisonic (FOA/HOA) outputs. In addition, there can be an interface for external rendering, where the output format(s) can correspond, e.g., to the input formats.

As the spatial (for example MASA) metadata depicts the desired spatial audio perception in an output-format-agnostic manner, any stream with spatial metadata can be flexibly rendered to any of the aforementioned output formats. However, as the MASA stream can originate from a variety of inputs, the transport audio signals, that the decoder receives, may have different characteristics. Hence a decoder has to take these aspects into account in order to be able to produce optimal audio quality.

SUMMARY

There is provided according to a first aspect an apparatus comprising means configured to: obtain at least two audio signals; determine a type of the at least two audio signals; and process the at least two audio signals configured to be rendered based on the determined type of the at least two audio signals.

The at least two audio signals may be one of: transport audio signals; and previously processed audio signals.

The means may be configured to obtain at least one parameter associated with the at least two audio signals.

The means configured to determine a type of the at least two audio signals may be configured to determine the type of the at least two audio signals based on the at least one parameter associated with the at least two audio signals.

The means configured to determine the type of the at least two audio signals based on the at least one parameter may be configured to perform one of: extract and decode at least one type signal from the at least one parameter; and when the at least one parameter represents a spatial audio aspect associated with the at least two audio signals, analyse the at least one parameter to determine the type of the at least two audio signals.

The means configured to analyse the at least one parameter to determine the type of the at least two audio signals may be configured to: determine a broadband left or right channel to total energy ratio based on the at least two audio signals; determine a higher frequency left or right channel to total energy ratio based on the at least two audio signals; determine a sum to total energy ratio based on the at least two audio signals; determine a subtract to target energy ratio based on the at least two audio signals; and determine the type of the at least two audio signals based on at least one of: the broadband left or right channel to total energy ratio; the higher frequency left or right channel to total energy ratio based on the at least two audio signals; the sum to total energy ratio based on the at least two audio signals; and the subtract to target energy ratio.

The means may be configured to determine at least one type parameter associated with the type of the at least one audio signal.

The means configured to process the at least two audio signals configured to be rendered based on the determined type of the at least two audio signals may be configured to convert the at least two audio signals based on the at least one type parameter associated with the type of the at least two audio signals.

The type of the at least two audio signals may comprise at least one of: a capture microphone arrangement; a capture microphone separation distance; a capture microphone parameter; a transport channel identifier; a spaced audio signal type; a downmix audio signal type; a coincident audio signal type; and a transport channel arrangement.

The means configured to process the at least two audio signals configured to be rendered based on the determined type of the at least two audio signals may be configured to: convert the at least two audio signals into an ambisonic audio signal representation; convert the at least two audio signals into a multichannel audio signal representation; and downmix the at least two audio signals into fewer audio signals.

The means configured to process the at least two audio signals configured to be rendered based on the determined type of the at least two audio signals may be configured to generate at least one prototype signal based on the at least two audio signals and the type of the at least two audio signals.

According to a second aspect there is provided a method comprising: obtaining at least two audio signals; determining a type of the at least two audio signals; processing the at least two audio signals configured to be rendered based on the determined type of the at least two audio signals.

The at least two audio signals may be one of: transport audio signals; and previously processed audio signals.

The method may further comprise obtaining at least one parameter associated with the at least two audio signals.

Determining a type of the at least two audio signals may comprise determining the type of the at least two audio signals based on the at least one parameter associated with the at least two audio signals.

Determining the type of the at least two audio signals based on the at least one parameter may comprise one of: extracting and decoding at least one type signal from the at least one parameter; and when the at least one parameter represents a spatial audio aspect associated with the at least two audio signals, analysing the at least one parameter to determine the type of the at least two audio signals.

Analysing the at least one parameter to determine the type of the at least two audio signals may comprise: determining a broadband left or right channel to total energy ratio based on the at least two audio signals; determining a higher frequency left or right channel to total energy ratio based on the at least two audio signals; determining a sum to total energy ratio based on the at least two audio signals; determining a subtract to target energy ratio based on the at least two audio signals; and determining the type of the at least two audio signals based on at least one of: the broadband left or right channel to total energy ratio; the higher frequency left or right channel to total energy ratio based on the at least two audio signals; the sum to total energy ratio based on the at least two audio signals; and the subtract to target energy ratio.

The method may further comprise determining at least one type parameter associated with the type of the at least one audio signal.

Processing the at least two audio signals configured to be rendered based on the determined type of the at least two audio signals may further comprises converting the at least two audio signals based on the at least one type parameter associated with the type of the at least two audio signals.

The type of the at least two audio signals may comprise at least one of: a capture microphone arrangement; a capture microphone separation distance; a capture microphone parameter; a transport channel identifier; a spaced audio signal type; a downmix audio signal type; a coincident audio signal type; and a transport channel arrangement.

Processing the at least two audio signals configured to be rendered based on the determined type of the at least two audio signals may comprise one of: converting the at least two audio signals into an ambisonic audio signal representation; converting the at least two audio signals into a multichannel audio signal representation; and downmixing the at least two audio signals into fewer audio signals.

Processing the at least two audio signals configured to be rendered based on the determined type of the at least two audio signals may comprise generating at least one prototype signal based on the at least two audio signals and the type of the at least two audio signals.

According to a third aspect there is provided an apparatus comprising at least one processor and at least one memory including a computer program code, the at least one memory and the computer program code configured to, with the at least one processor, cause the apparatus at least to: obtain at least two audio signals; determine a type of the at least two audio signals; and process the at least two audio signals configured to be rendered based on the determined type of the at least two audio signals.

The at least two audio signals may be one of: transport audio signals; and previously processed audio signals.

The means may be configured to obtain at least one parameter associated with the at least two audio signals.

The apparatus caused to determine a type of the at least two audio signals may be caused to determine the type of the at least two audio signals based on the at least one parameter associated with the at least two audio signals.

The apparatus caused to determine the type of the at least two audio signals based on the at least one parameter may be caused to perform one of: extract and decode at least one type signal from the at least one parameter; and when the at least one parameter represents a spatial audio aspect associated with the at least two audio signals, analyse the at least one parameter to determine the type of the at least two audio signals.

The apparatus caused to analyse the at least one parameter to determine the type of the at least two audio signals may be caused to: determine a broadband left or right channel to total energy ratio based on the at least two audio signals; determine a higher frequency left or right channel to total energy ratio based on the at least two audio signals; determine a sum to total energy ratio based on the at least two audio signals; determine a subtract to target energy ratio based on the at least two audio signals; and determine the type of the at least two audio signals based on at least one of: the broadband left or right channel to total energy ratio; the higher frequency left or right channel to total energy ratio based on the at least two audio signals; the sum to total energy ratio based on the at least two audio signals; and the subtract to target energy ratio.

The apparatus may be caused to determine at least one type parameter associated with the type of the at least one audio signal.

The apparatus caused to process the at least two audio signals configured to be rendered based on the determined type of the at least two audio signals may be caused to convert the at least two audio signals based on the at least one type parameter associated with the type of the at least two audio signals.

The type of the at least two audio signals may comprise at least one of: a capture microphone arrangement; a capture microphone separation distance; a capture microphone parameter; a transport channel identifier; a spaced audio signal type; a downmix audio signal type; a coincident audio signal type; and a transport channel arrangement.

The apparatus caused to process the at least two audio signals configured to be rendered based on the determined type of the at least two audio signals may be caused to: convert the at least two audio signals into an ambisonic audio signal representation; convert the at least two audio signals into a multichannel audio signal representation; and downmix the at least two audio signals into fewer audio signals.

The apparatus caused to process the at least two audio signals configured to be rendered based on the determined type of the at least two audio signals may be caused to generate at least one prototype signal based on the at least two audio signals and the type of the at least two audio signals.

According to a fourth aspect there is provided an apparatus comprising: obtaining circuitry configured to obtain at least two audio signals; determining circuitry configured to determine a type of the at least two audio signals; processing circuitry configured to process the at least two audio signals configured to be rendered based on the determined type of the at least two audio signals.

According to a fifth aspect there is provided a computer program comprising instructions [or a computer readable medium comprising program instructions] for causing an apparatus to perform at least the following: obtaining at least two audio signals; determining a type of the at least two audio signals; processing the at least two audio signals configured to be rendered based on the determined type of the at least two audio signals.

According to a sixth aspect there is provided a non-transitory computer readable medium comprising program instructions for causing an apparatus to perform at least the following: obtaining at least two audio signals; determining a type of the at least two audio signals; processing the at least two audio signals configured to be rendered based on the determined type of the at least two audio signals.

According to a seventh aspect there is provided an apparatus comprising: means for obtaining at least two audio signals; means for determining a type of the at least two audio signals; means for processing the at least two audio signals configured to be rendered based on the determined type of the at least two audio signals.

According to an eighth aspect there is provided a computer readable medium comprising program instructions for causing an apparatus to perform at least the following: obtaining at least two audio signals; determining a type of the at least two audio signals; processing the at least two audio signals configured to be rendered based on the determined type of the at least two audio signals.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of efficient rendering of spatial metadata assisted audio signals.

Figure 1:
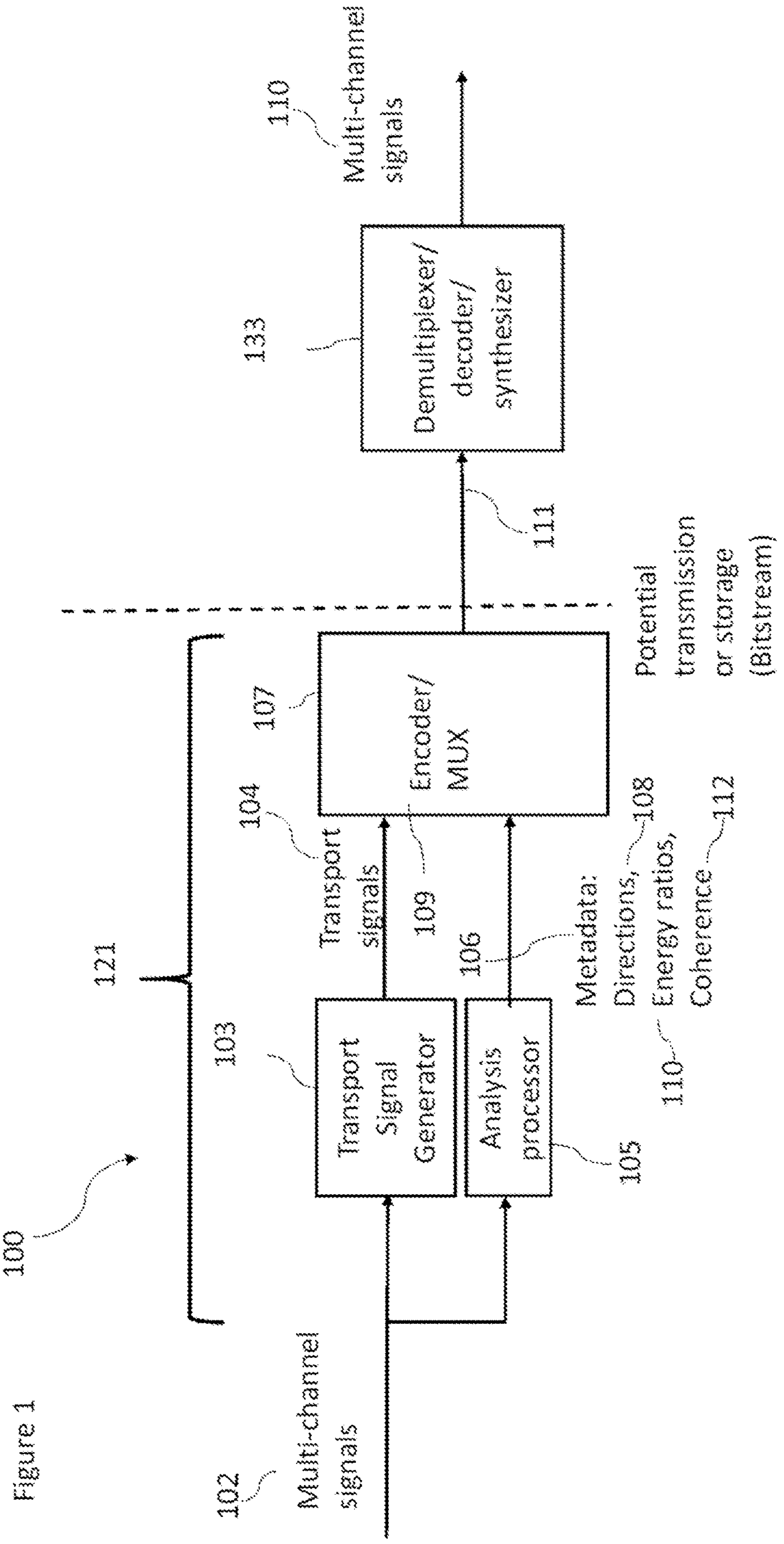
FIG. 1 shows schematically a system of apparatus suitable for implementing some embodiments.

With respect to FIG. 1 an example apparatus and system for implementing audio capture and rendering are shown. The system 100 is shown with an 'analysis' part 121 and a 'demultiplexer/decoder/synthesizer' part 133. The 'analysis' part 121 is the part from receiving the multi-channel loudspeaker signals up to an encoding of the metadata and transport signal and the 'demultiplexer/decoder/synthesizer' part 133 is the part from a decoding of the encoded metadata and transport signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example in some embodiments the spatial analyser and the spatial analysis may be implemented external to the encoder. For example in some embodiments the spatial metadata associated with the audio signals may be a provided to an encoder as a separate bit-stream. In some embodiments the spatial metadata may be provided as a set of spatial (direction) index values.

The multi-channel signals are passed to a transport signal generator 103 and to an analysis processor 105.

In some embodiments the transport signal generator 103 is configured to receive the multi-channel signals and generate a suitable transport signal comprising a determined number of channels and output the transport signals 104. For example the transport signal generator 103 may be configured to generate a 2 audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to 'encoder/MUX' block 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, a direction parameter 108 and an energy ratio parameter 110 (an example of which is a diffuseness parameter) and a coherence parameter 112. The direction, energy ratio and coherence parameters may in some embodiments be considered to be spatial audio parameters. In other words the spatial audio parameters comprise parameters which aim to characterize the sound-field created by the multi-channel signals (or two or more playback audio signals in general).

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The transport signals 104 and the metadata 106 may be passed to an 'encoder/MUX' block 107.

In some embodiments, the spatial audio parameters may be grouped or separated into directional and non-directional (such as, e.g., diffuse) parameters.

The 'encoder/MUX' block 107 may be configured to receive the transport (for example downmix) signals 104 and generate a suitable encoding of these audio signals. The 'encoder/MUX' block 107 can in some embodiments be a computer (running suitable software stored on memory and on at least one processor), or alternatively a specific device utilizing, for example, FPGAs or ASICs. The encoding may be implemented using any suitable scheme. The 'encoder/MUX' block 107 may furthermore be configured to receive the metadata and generate an encoded or compressed form of the information. In some embodiments the 'encoder/MUX' block 107 may further interleave, multiplex to a single data stream 111 or embed the metadata within encoded downmix signals before transmission or storage shown in FIG. 1 by the dashed line. The multiplexing may be implemented using any suitable scheme.

In the decoder side, the received or retrieved data (stream) may be received by a 'demultiplexer/decoder/synthesizer' 133. The 'demultiplexer/decoder/synthesizer' 133 may demultiplex the encoded streams and decode the audio signals to obtain the transport signals. Similarly the 'demultiplexer/decoder/synthesizer' 133 may be configured to receive and decode the encoded metadata. The 'demultiplexer/decoder/synthesizer' 133 can in some embodiments be a computer (running suitable software stored on memory and on at least one processor), or alternatively a specific device utilizing, for example, FPGAs or ASICs.

The system 100 'demultiplexer/decoder/synthesizer' part 133 may further be configured to re-create in any suitable format a synthesized spatial audio in the form of multi-channel signals 110 (these may be multichannel loudspeaker format or in some embodiments any suitable output format such as binaural signals for headphone listening or Ambisonics signals, depending on the use case) based on the transport signals and the metadata.

Therefore in summary first the system (analysis part) is configured to receive multi-channel audio signals.

Then the system (analysis part) is configured to generate a suitable transport audio signal (for example by selecting or downmixing some of the audio signal channels).

The system is then configured to encode for storage/transmission the transport signal and the metadata.

After this the system may store/transmit the encoded transport and metadata.

The system may retrieve/receive the encoded transport and metadata.

Then the system is configured to extract the transport and metadata from encoded transport and metadata parameters, for example demultiplex and decode the encoded transport and metadata parameters.

The system (synthesis part) is configured to synthesize an output multi-channel audio signal based on extracted transport audio signals and metadata. With respect to the decoder (the synthesis part) it is configured to receive the spatial metadata and transport audio signals which could be for example (potentially pre-processed versions of) a downmix of a 5.1 signal, two spaced microphone signals from a mobile device or two beam patterns from a coincident microphone array.

The decoder may be configured to render spatial audio (such as Ambisonics) from the spatial metadata and the transport audio signals. This is typically achieved by employing one of two approaches for rendering spatial audio from such input: linear and parametric rendering.

Assuming processing in frequency bands, linear rendering refers to utilizing some static mixing weights to generate the desired output. Parametric rendering refers to modifying the transport audio signals based on the spatial metadata to generate the desired output.

Methods for generating Ambisonics from various inputs have been presented:

In the case of transport audio signals and spatial metadata from 5.1. signals, parametric processing can be used to render Ambisonics;

In the case of transport audio signals and spatial metadata from spaced microphones, a combination of linear and parametric processing can also be used; In the case of transport audio signals and spatial metadata from coincident microphones, a combination of linear and parametric processing can be used.

So, there are various methods for rendering Ambisonics from various kind of inputs. However, all of these Ambisonic rendering methods assume a certain kind of input. Some embodiments as discussed hereafter shown apparatus and methods which prevent issues like the following occurring.

Using linear rendering, the Y signal, which is the left-right oriented first-order (figure-of-eight) signal in Ambisonics, can be created from two coincident opposing cardioids by $Y(f)=S_0(f)-S_1(f)$, where f is frequency. As another example, the Y signal can be created from spaced microphones by $Y(f)=-i(S_0(f)-S_1(f))g_{eq}(f)$ where $g_{eg}(f)$ is a frequency-dependent equalizer (that depends on the microphone distance) and i is the imaginary unit. The processing for spaced microphones (containing the −90-degree phase shift and the frequency-dependent equalization) is different from the processing for the coincident microphones and using the wrong processing technique may cause audio quality deterioration.

Using parametric rendering in some rendering schemes requires generating "prototype" signals using linear means. These prototype signals are then modified adaptively in the time-frequency domain based on the spatial metadata. Optimally, the prototype signal should follow the target signal as much as possible, so that there is minimal need for the parametric processing, and thus potential artefacts from parametric processing are minimized. For example a prototype signal should contain to a sufficient extent all the signal components relevant for the corresponding output channels.

When, as an example, the omnidirectional signal W is rendered (similar effects are present also with other Ambisonic signals) a prototype can be created from stereo transport audio signals with, e.g., two straightforward approaches:

Select one channel (e.g., left channel); or

Sum of the two channels.

The selection of which depends significantly on the transport audio signal type. If the transport signals originate from 5.1 signals, typically left-side signals are only the left transport audio signal, and right-side signals are only the right transport audio signal (when using common downmix matrices). Hence, using one channel for the prototype would lose the signal content of the other channel, leading to the generation of clear artefacts (for example, in a worst case scenario, there is no signal at all present at the one selected channel). Therefore at this case the W prototype were better to be formulated as the sum of both channels. On the other hand, if the transport signals originate from spaced microphones, using a sum of the transport audio signals as a prototype for the W signal leads to severe comb filtering (as there are time delays between the signals). This would cause similar artefacts as presented above. In this case, it would be better to select only one of the two channels as the W prototype, at least at the higher frequency range.

Thus, there is no one good choice that would fit all transport audio signal types.

Hence, with both linear and parametric methods, applying spatial audio processing designed for a certain transport audio signal type to another transport audio signal type is expected to produce clear deterioration of audio quality.

The concept as discussed in further detail with respect to the following embodiments and examples relates to audio encoding and decoding where the decoder receives at least two transport audio signals from the encoder. Furthermore the embodiments may be where the transport audio signal could be of at least two types, for example a downmix of a 5.1 signal, spaced microphone signals, or coincident microphone signals. Additionally in some embodiments the apparatus and methods implement a solution to improve the quality of the processing of the transport audio signal and provide a determined output (e.g. Ambisonics, 5.1, mono). The quality may be improved by determining the type of the transport audio signals and performing the processing of audio based on the determined transport audio signal type.

In some embodiments as discussed in further detail herein the transport audio signal type is determined by either:

- obtaining metadata that states the transport audio signal type, or
- determining the transport audio signal type based on the transport audio signals (and potentially spatial metadata if that is available) themselves.

The metadata stating the transport audio signal type may include, for example, the following conditions:

- spaced microphones (possibly accompanied with the positions of the microphones);
- coincident microphones or beams effectively similar to coincident microphones (possibly accompanied with directional patterns of the microphones);
- downmix from multichannel audio signals (such as 5.1).

The determination of the transport audio signal type based on an analysis of the transport audio signals themselves may be based on comparing frequency bands or spectral effects of combining (in different ways) to the expected spectral effects (partially based on the spatial metadata if that is available).

The processing of the audio signals furthermore in some embodiments may comprise:

- rendering Ambisonic signals;
- rendering multichannel audio signals (e.g., 5.1); and
- downmixing transport audio signals to fewer number of audio signals.

Figure 2:
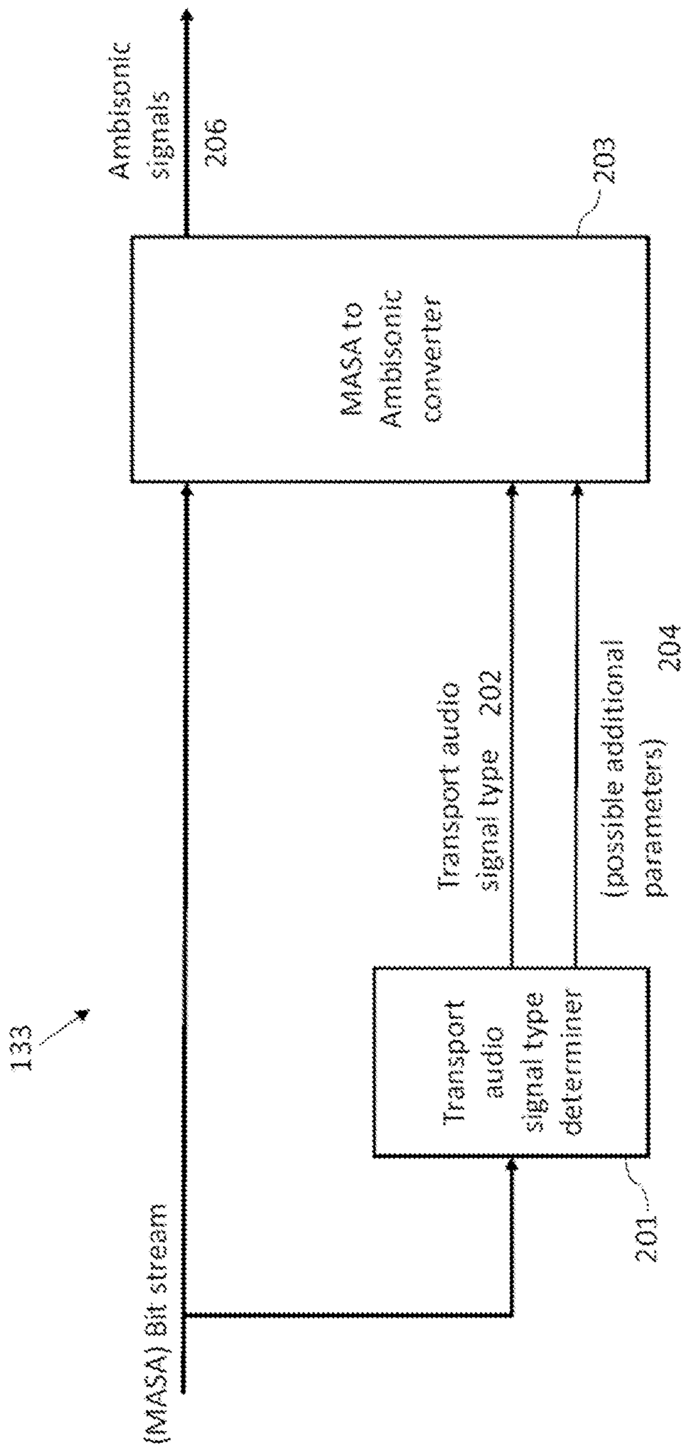
FIG. 2 shows schematically an example decoder/renderer according to some embodiments.

FIG. 2 shows a schematic view of an example decoder suitable for implementing some embodiments. The example embodiment could for example be implemented within the 'demultiplexer/decoder/synthesizer' block 133. In this example, the input is a metadata assisted spatial audio (MASA) stream containing two audio channels and spatial metadata. However as discussed herein the input format may be any suitable metadata assisted spatial audio format.

The (MASA) bitstream is forwarded to a transport audio signal type determiner 201. The transport audio signal type determiner 201 is configured to determine the transport audio signal type 202, and possibly some additional parameters 204 (such as microphone distance) based on the bitstream. The determined parameters are forwarded to a MASA to Ambisonic signals converter 203.

The MASA to Ambisonic signals converter 203 is configured to receive the bitstream and the transport audio signal type 202 (and possibly some additional parameters 204) and is configured to convert the MASA stream to Ambisonic signals based on the determined transport audio signal type 202 (and possible additional parameters 204).

Figure 3:
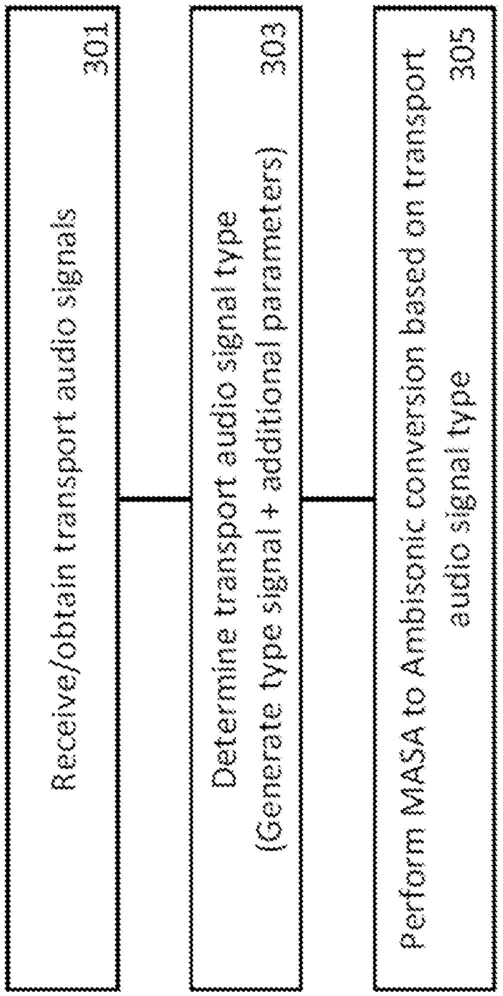
FIG. 3 shows a flow diagram of the operation of the example decoder/renderer according to some embodiments.

The operation of the example is summarised in the flow-diagram shown in FIG. 3.

The first operation is one of receiving or obtaining the bitstream (the MASA stream) as shown in FIG. 3 by step 301.

The following operation is one of determining the transport audio signal type based on the bitstream (and generating a type signal or indicator and possible other additional parameters) as shown in FIG. 3 by step 303.

Having determined the transport audio signal type the next operation is converting the bitstream (MASA stream) to Ambisonic signals based on the determined transport audio signal type as shown in FIG. 3 by step 305.

Figure 4:
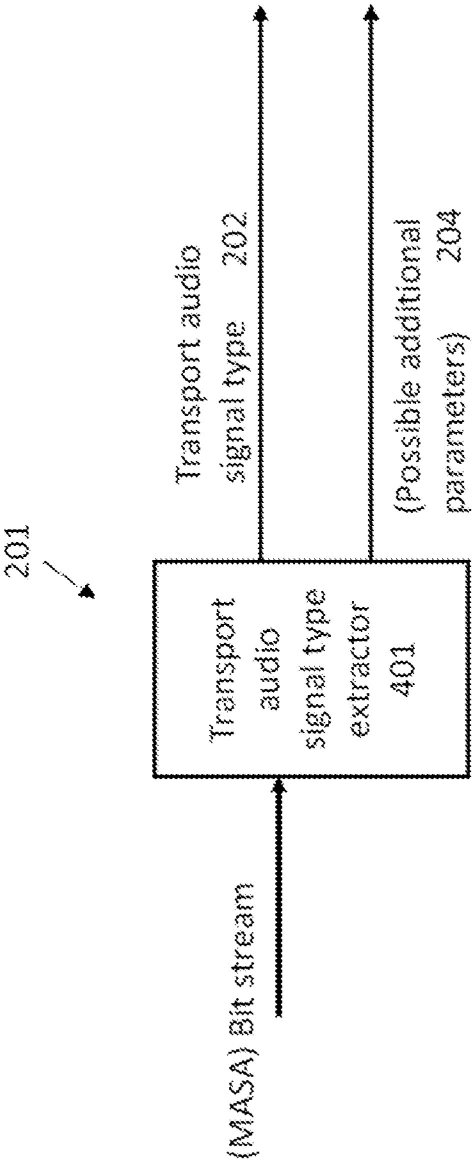
FIG. 4 shows schematically an example transport audio signal type determiner as shown in FIG. 2 according to some embodiments.

FIG. 4 shows a schematic view of an example transport audio signal type determiner 201. In this example the example transport audio signal type determiner is suitable where the transport audio signal type is available in the MASA stream.

The example transport audio signal type determiner 201 in this example comprises a transport audio signal type extractor 401. The transport audio signal type extractor 401 is configured to receive the bit (MASA) stream and extract (i.e., read and/or decode) the type indicator from the MASA stream. This kind of information may, for example, be available in the "Channel audio format" field of the MASA stream. In addition, if additional parameters are available, they are extracted, too. This information is outputted from the transport audio signal type extractor 401. In some embodiments the transport audio signal types may comprise "spaced", "downmix", "coincident". In some other embodiments the transport audio signal types may comprise any suitable value.

Figure 5:
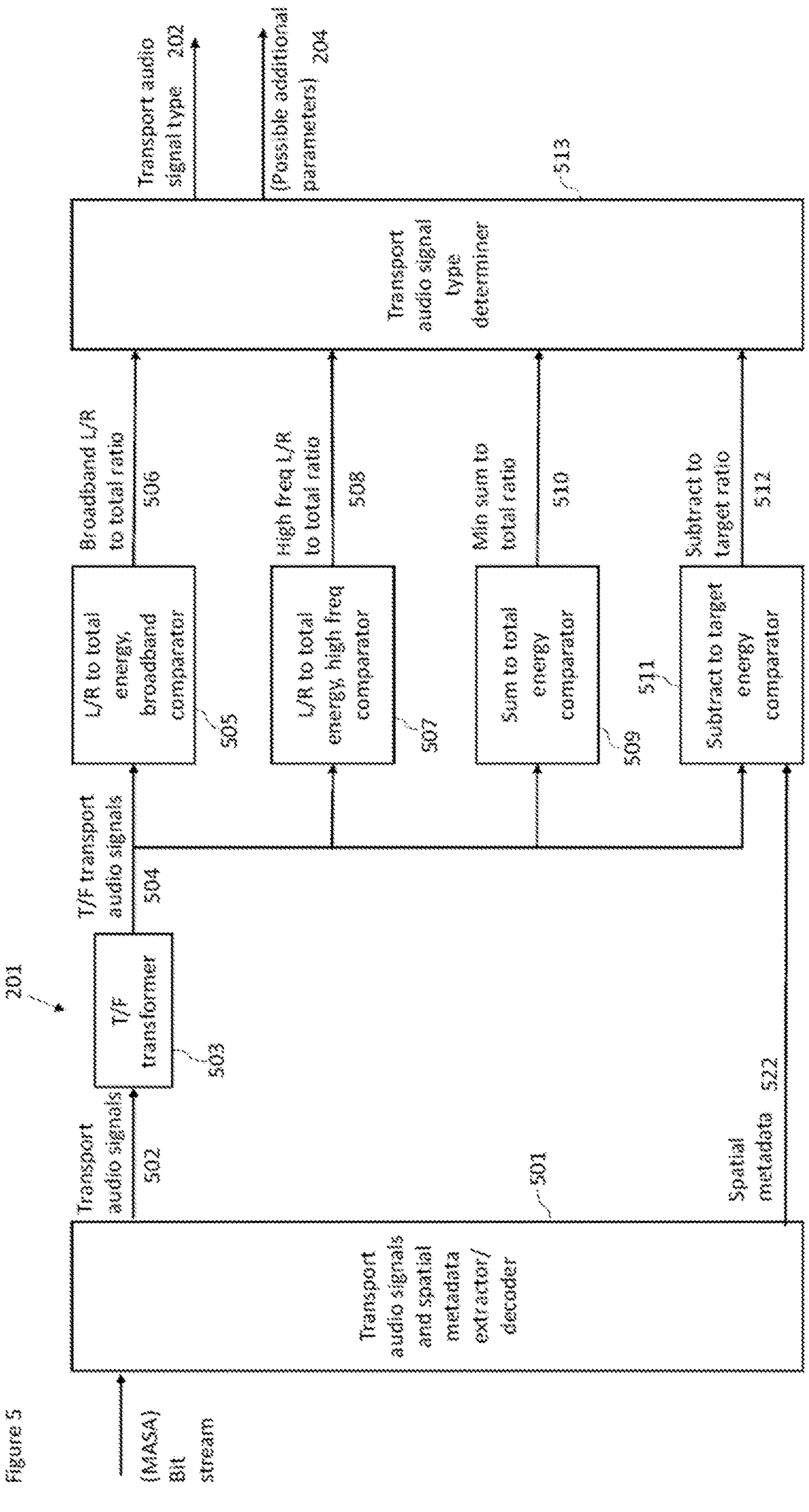
FIG. 5 shows schematically a second example transport audio signal type determiner as shown in FIG. 2 according to some embodiments.

FIG. 5 shows a schematic view of a further example transport audio signal type determiner 201. In this example the transport audio signal type is not available to be extracted or decoded from the MASA stream directly. As such this example estimates or determines the transport audio signal type from an analysis of the MASA stream. This determination in some embodiments is based on using a set of estimators/energy comparisons that reveal certain spectral effects of the different transport audio signal types.

In some embodiments the transport audio signal type determiner 201 comprises a transport audio signals and spatial metadata extractor/decoder 501. The transport audio signals and spatial metadata extractor/decoder 501 is configured to receive the MASA stream and extract and/or decode transport audio signals and spatial metadata from the MASA stream. The resulting transport audio signals 502 can be forwarded to a time/frequency transformer 503. The resulting spatial metadata 522 furthermore can be forwarded to a subtract to target energy comparator 511.

In some embodiments the transport audio signal type determiner 201 comprises a time/frequency transformer 503. The time/frequency transformer 503 is configured to receive the transport audio signals 502 and convert them to the time-frequency domain. Suitable transforms include, e.g., short-time Fourier transform (STFT) and complex-modulated quadrature mirror filterbank (QMF). The resulting signals are denoted as $S_i(b,n)$, where i is the channel index, b the frequency bin index, and n time index. In situations where the transport audio signals (output from the extractor and/or decoder) is already in the time-frequency domain, this may be omitted, or alternatively may contain a transform from one time-frequency domain representation to another time-frequency domain representation. The T/F-domain transport audio signals 504 can be forwarded to comparators.

In some embodiments the transport audio signal type determiner 201 comprises a broadband L/R to total energy comparator 505. The broadband L/R to total energy comparator 505 is configured to receive the T/F-domain transport audio signals 504 and output a broadband L/R to total ratio parameter.

Within the broadband L/R to total energy comparator 505 a broadband left, right, and total energies are computed:

$$E_{left,bb}(n) = \sum_{b=0}^{B-1} |S_0(b, n)|^2;$$

$$E_{right,bb}(n) = \sum_{b=0}^{B-1} |S_1(b, n)|^2;$$

$$E_{total,bb}(n) = E_{left,bb}(n) + E_{right,bb}(n),$$

where B is the number of frequency bins. These energies are smoothed by, for example, $$E_{x,bb}'(n)=a_1E_{x,bb}(n)+b_1E_{x,bb}'(n-1),$$

where $a_1$ and $b_1$ are smoothing coefficients (e.g., $a_1$=0.01 and $b_1=1-a_1$). The broadband L/R to total energy comparator 505 is then configured to select and scale the smallest left and right energies:

$$E_{lr,bb}'(n)=2\ \min(E_{left,bb}'(n),E_{right,bb}'(n)).$$

where the multiplier 2 is to normalize the energy with respect to $E_{total,bb}'(n)$ that was the sum of two channels.

The broadband L/R to total energy comparator 505 may then generate the broadband L/R to total ratio 506 as:

$$\beta(n) = 10\log_{10}\frac{E'_{lr,bb}(n)}{E'_{total,bb}(n)},$$

which is then output as the ratio 506.

In some embodiments the transport audio signal type determiner 201 comprises a high frequency L/R to total energy comparator 507. The high frequency L/R to total energy comparator 507 is configured to receive the T/F-domain transport audio signals 504 and output a high frequency L/R to total ratio parameter.

Within the broadband L/R to total energy comparator 507 a high frequency band left, right, and total energies are computed:

$$E_{left,bb}(n) = \sum_{b=0}^{B-1} |S_0(b, n)|^2;$$

$$E_{right,bb}(n) = \sum_{b=0}^{B-1} |S_1(b, n)|^2;$$

$$E_{total,bb}(n) = E_{left,bb}(n) + E_{right,bb}(n), ,$$

where $B_1$ the first bin where the high-frequency region is defined to start (the value depends on the applied T/F transform, it may, e.g., correspond to 6 kHz). These energies are smoothed by, for example, $$E_{x,hi}'(n)=a_2E_{x,hi}(n)+b_2E_{x,hi}'(n-1),$$

where $a_2$ and $b_2$ are smoothing coefficients. The energy differences may occur at faster pace at high frequencies, so the smoothing coefficients may be set to provide less smoothing (e.g., $a_2=0.1$ and $b_2=1-a_2$).

The high frequency L/R to total energy comparator 507 can then be configured to select the smaller from left and right energies, and the result is multiplied by 2:

$$E_{lr,hi}'(n)=2\min(E_{left,hi}'(n),E_{right,hi}'(n))$$

The high frequency L/R to total energy comparator 507 may then generate the high frequency L/R to total ratio 508 as:

$$\eta(n)=10\log_{10}\frac{E'_{lr,hi}(n)}{E'_{total,hi}(n)}$$

which is then output.

In some embodiments the transport audio signal type determiner 201 comprises a sum to total energy comparator 509. The sum to total energy comparator 509 is configured to receive the T/F-domain transport audio signals 504 and output a sum to total energy ratio parameter. The sum to total energy comparator 509 is configured to detects situations where at some frequencies the two channels are out-of-phase, which is a typical phenomenon in particular for spaced microphone recordings.

The sum to total energy comparator 509 is configured to compute the energy of a sum signal and the total energy for each frequency bin:

$$E_{sum}(b,n)=|S_0(b,n)+S_1(b,n)|^2;$$

$$E_{total}(b,n)=|S_0(b,n)|^2+|S_1(b,n)|^2.$$

These energies can be smoothed by, for example, $$E_x'(b,n)=a_3E_x(b,n)+b_3E_x'(b,n-1),$$

where $a_3$ and $b_3$ are smoothing coefficients (e.g., $a_3=0.01$ and $b_3=1-a_3$).

The sum to total energy comparator 509 is then configured to compute the minimum sum to total ratio 510 as:

$$\chi(n)=10\log_{10}\min_b\frac{E'_{sum}(b,n)}{E'_{total}(b,n)},\quad 0\le b\le B_2,$$

where $B_2$ is the highest bin of the frequency region where this computation is performed (the value depends on the used T/F transform, it may, for example, correspond to 10 kHz).

The sum to total energy comparator 509 is then configured to output the ratio x(n) 510.

In some embodiments the transport audio signal type determiner 201 comprises a subtract to target energy comparator 511. The subtract to target energy comparator 511 is configured to receive the T/F-domain transport audio signals 504 and the spatial metadata 522 and output a subtract to target energy ratio parameter 512.

The subtract to target energy comparator 511 is configured to compute the energy of difference of the left and right channels:

$$E_{sub}(b,n)=|S_0(b,n)-S_1(b,n)|^2.$$

This can be considered to be, for at least some input signal types, a "prototype" of a Y signal of Ambisonics (Y signal has a directional pattern of a dipole, with positive lobe on the left, and negative lobe on the right).

The subtract to target energy comparator 511 can then be configured to compute the target energy $E_{target}(b,n)$ for the Y signal. This is based on estimating how the total energy should be distributed among the spherical harmonics based on the spatial metadata. For example in some embodiments the subtract to target energy comparator 511 is configured to construct a target covariance matrix (channel energies and cross-correlations) based on the spatial metadata and an energy estimate. However, in some embodiments only the energy of the Y signal is estimated, which is one entry of the target covariance matrix. Thus, as the target energy $E_{target}(b,n)$ for the Y is composed of two parts:

$$E_{target}(b,n)=E_{target,amb}+E_{target,dir}(b,n),$$

where $E_{target,amb}(b,n)$ is the ambience/non-directional part of the target energy, defined by $$E_{target,amb}(b,n)=\frac{E_{total}(b,n)}{3}(1-r(b,n))(1-c_{sur}(b,n)),$$

where r(b,n) is the direct-to-total energy ratio parameter between 0 and 1 of the spatial metadata and $c_{sur}(b,n)$ is the surround coherence parameter between 0 and 1 of the spatial metadata (surround-coherent sound is not captured by Y dipole since positive and negative lobes cancel each other in that case). The division by 3 is since we assume SN3D normalization scheme for the Ambisonic output, and the ambience energy of the Y component is in that case a third of the total omni-energy.

It should be noted that the spatial metadata may be of lower frequency and/or time resolution than for every b,n such that the parameters could be the same for several frequency or time indices.

The $E_{target,dir}(b,n)$ is the energy of the more directional part. In formulation of that, a spread-coherence distributor vector as a function of spread coherence $c_{spread}(b,n)$ parameter between 0 and 1 in the spatial metadata needs to be defined:

$$v_{DISTR,3}(b,n)=\begin{cases}\begin{bmatrix}(2-2c_{spread}(b,n))\\1\\1\end{bmatrix}\dfrac{1}{\sqrt{(2-2c_{spread}(b,n))^2+2}}, & \text{when } c_{spread}(b,n)>0.5\\ \begin{bmatrix}1\\0\\0\end{bmatrix}(1-c_{spread}(b,n))+\begin{bmatrix}\sqrt{1/3}\\\sqrt{1/3}\\\sqrt{1/3}\end{bmatrix}c_{spread}(b,n), & \text{otherwise}\end{cases}.$$

The subtract to target energy comparator 511 can also be configured to determine a vector of azimuth values:

$$\theta(b,n)=\theta(b,n)+\begin{bmatrix}0\\ \pi/6\\ -\pi/6\end{bmatrix},$$

where θ(b,n) is the azimuth value at the spatial metadata in radians. Assuming a vector-entry based sin( ) operation, the direct part target energy is then $$E_{target,dir}(b,n)=\sin(\theta(b,n))^T v_{DISTR,3}(b,n)E_{total}(b,n)r(b,n).$$

Thus $E_{target}$(b,n) is obtained. These energies can in some embodiments be smoothed by, for example, $$E_x'(b,n)=a_4E_x(b,n)+b_4E_x'(b,n-1)$$

where $a_4$ and $b_4$ are smoothing coefficients (e.g., $a_4$=0.0004 and $b_4=1-a_4$).

Furthermore the subtract to target energy comparator 511 is configured to compute the subtract to target ratio 512 using the energies at the lowest frequency bin as:

$$v(n)=10\log_{10}\frac{E'_{sub}(0,n)}{E'_{target}(0,n)}$$

which is then output.

In some embodiments the transport audio signal type determiner 201 comprises a transport audio signal type (based on estimated metrics) determiner 513. The transport audio signal type determiner 513 is configured to receive the broadband L/R to total ratio 506, high frequency L/R to total ratio 508, min sum to total ratio 510, and subtract to target ratio 512 and to determine a transport audio signal type based on these received estimated metrics.

The decision can be done in a variety of ways, and actual implementations may differ in many aspects, such as the used T/F transform. An example, non-limiting form may be, that the transport audio signal type (based on estimated metrics) determiner 513 first computes a change to spaced metric:

$$\Xi_s(n)=\frac{(-v(n)-3)}{3}+\frac{\max(-\chi(n),0)}{6}+\frac{\beta(n)}{6},$$
$$\text{if } v(n)<-3,$$
$$\text{else } \Xi_s(n)=0$$

The transport audio signal type (based on estimated metrics) determiner 513 can then be configured to compute change to downmix metrics:

$$\Xi_{d1}(n)=\frac{v(n)}{3}+\frac{\chi(n)+1}{6}+\frac{-\beta(n)}{6},$$
$$\text{if } v(n)>0,$$
$$\text{else } \Xi_{d1}(n)=0$$

-continued $$\Xi_{d2}(n)=\frac{(-v(n)+4)}{3}+\frac{\chi(n)}{6}+\frac{(-\eta(n)-12)}{3},$$
$$\text{if } v(n)<-12,$$
$$\text{else } \Xi_{d2}(n)=0.$$

The transport audio signal type (based on estimated metrics) determiner 513 can then, based on these metrics decide whether the transport audio signals originate from spaced microphones or they are a downmix from surround sound signals (such as 5.1). For example where if $\Xi_s(n)>1$, $T(n)$="spaced"

else if $\Xi_{d1}(n)>1 \vee \Xi_{d2}(n)>1$, $T(n)$="downmix"

else, $T(n)=T(n-1)$

In this example the transport audio signal type (based on estimated metrics) determiner 513 does not detect coincident microphone types. However, in practice, processing according to T(n)="downmix" type typically also can produce good audio in the case of coincident capture (e.g., with cardioids oriented towards left and right).

The transport audio signal type (based on estimated metrics) determiner 513 can then be configured to output the transport audio signal type T(n) as the transport audio signal type 202. In some embodiments other parameters 204 may be output.

Figure 6:
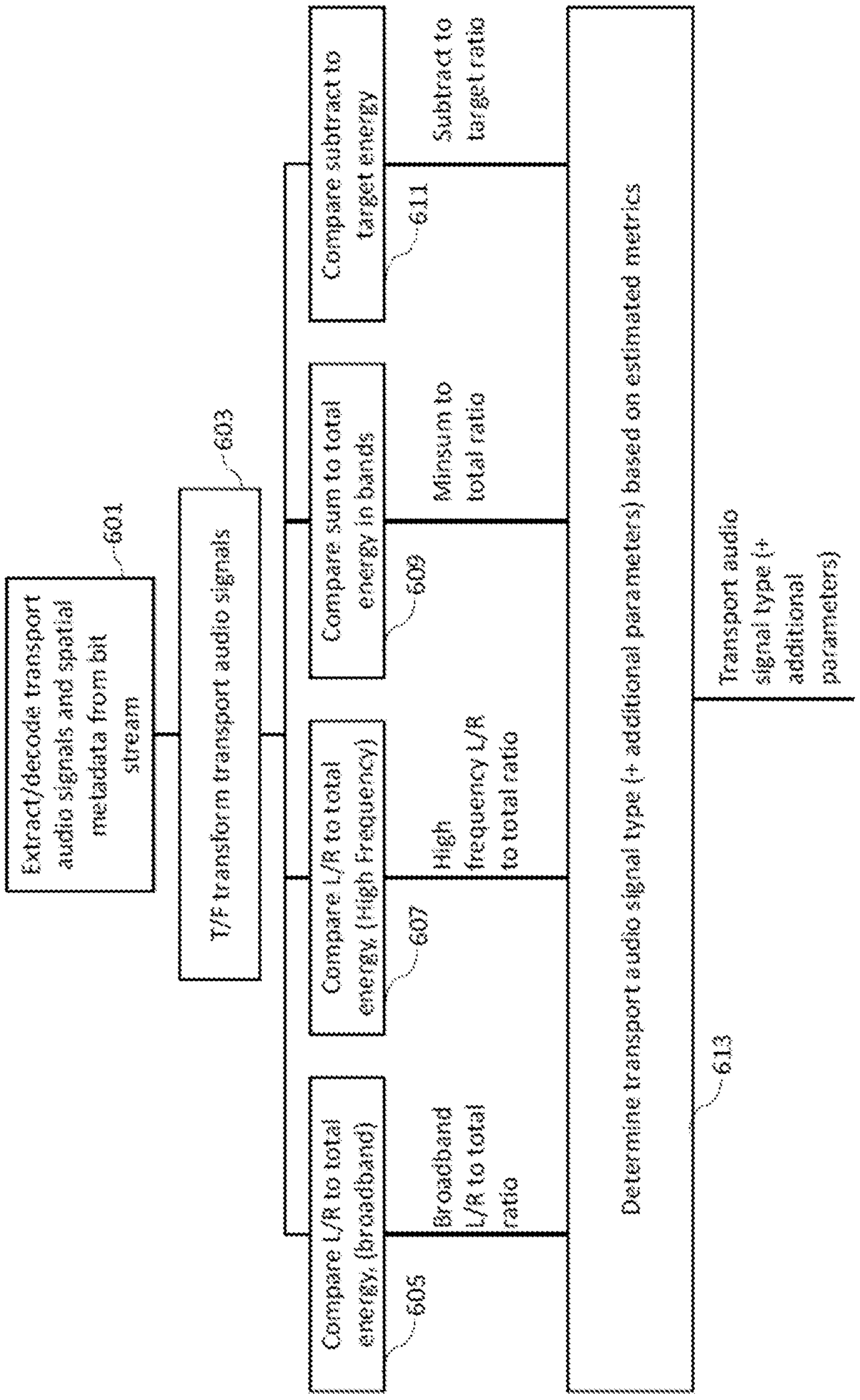
FIG. 6 shows a flow diagram of the operation of the second example transport audio signal type determiner according to some embodiments.

The FIG. 6 summarises the operations of the apparatus shown in FIG. 5. Thus in some embodiments the first operation is that of extracting and/or decoding the transport audio signals and metadata from the MASA stream (or bitstream) as shown in FIG. 6 by step 601.

The next operation may be time-frequency domain transform the transport audio signals as shown in FIG. 6 by step 603.

Then a series of comparisons may be made. For example by comparing broadband L/R energy to total energy values a broadband L/R to total energy ratio may be generated as shown in FIG. 6 by step 605.

For example by comparing high frequency L/R energy to total energy values a high frequency L/R to total energy ratio may be generated as shown in FIG. 6 by step 607.

By comparing sum energy to total energy values a sum to total energy ratio may be generated as shown in FIG. 6 by step 609.

Furthermore a subtract to target energy ratio may be generated as shown in FIG. 6 by step 611.

Having determined these metrics the method may then determine the transport audio signal type by analysing these metric ratios as shown in FIG. 6 by step 613.

Figure 7:
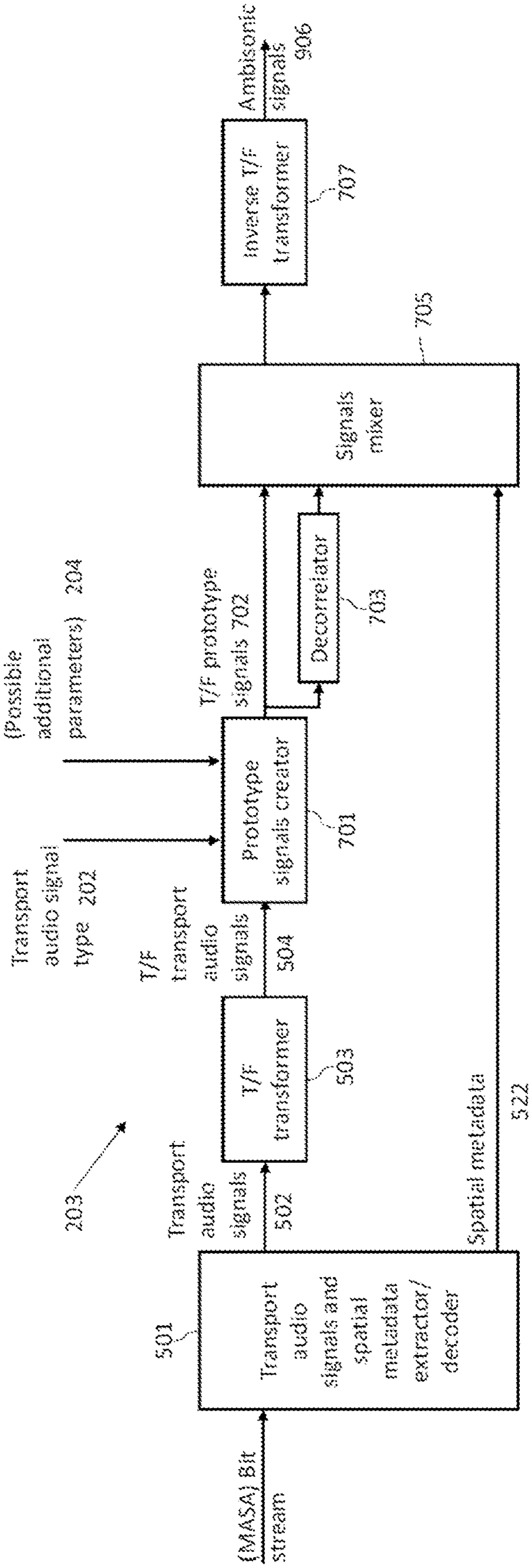
FIG. 7 shows schematically an example metadata assisted spatial audio signal to ambisonics format converter as shown in FIG. 2 according to some embodiments.

FIG. 7 shows an example MASA to Ambisonic converter 203 in further detail. The MASA to Ambisonic converter 203 is configured to receive the MASA stream (bitstream) and the transport audio signal type 202 and possible additional parameters 204 and is configured to convert the MASA stream to an Ambisonic signal based on the determined transport audio signal type.

The MASA to Ambisonic converter 203 comprises a transport audio signal and spatial metadata extractor/decoder 501. This is configured to receive the MASA stream and output transport audio signals 502 and spatial metadata 522 in the same manner as found within the transport audio signal type determiner as shown in FIG. 5 and discussed therein. In some embodiments the extractor/decoder 501 is the extractor/decoder from the transport audio signal type determiner. The resulting transport audio signals 502 can be forwarded to a time/frequency transformer 503. The resulting spatial metadata 522 furthermore can be forwarded to a signal mixer 705.

In some embodiments the MASA to Ambisonic converter 203 comprises a time/frequency transformer 503. The time/frequency transformer 503 is configured to receive the transport audio signals 502 and convert them to the time-frequency domain. Suitable transforms include, e.g., short-time Fourier transform (STFT) and complex-modulated quadrature mirror filterbank (QMF). The resulting signals are denoted as $S_i(b,n)$, where i is the channel index, b the frequency bin index, and n time index. In case the output of audio extraction and/or decoding is already in the time-frequency domain, this block may be omitted, or alternatively it may contain transform from one time-frequency domain representation to another time-frequency domain representation. The T/F-domain transport audio signals 504 can be forwarded to a prototype signals creator 701. In some embodiments the time/frequency transformer 503 is the same time/frequency transformer from the transport audio signal type determiner.

In some embodiments the MASA to Ambisonic converter 203 comprises a prototype signals creator 701. The prototype signals creator 701 is configured to receive the T/F-domain transport audio signals 504, the transport audio signal type 202 and the possible additional parameters 204. The T/F prototype signals 702 may then be output to the signals mixer 705 and the decorrelator 703.

In some embodiments the MASA to Ambisonic converter 203 comprises a decorrelator 703. The decorrelator 703 is configured to receive the T/F prototype signals 702 and apply a decorrelation and output decorrelated T/F prototype signals 704 to the signals mixer 705. In some embodiments the decorrelator 703 is optional.

In some embodiments the MASA to Ambisonic converter 203 comprises a signals mixer 705. The signals mixer 705 is configured to receive the T/F prototype signals 702 and decorrelated T/F prototype signals and spatial metadata 522.

The prototype signals creator 701 is configured to generate the prototype signals for each of the spherical harmonic of Ambisonics (FOA/HOA) based on the transport audio signal type.

In some embodiments the prototype signals creator 701 is configured to operate such that:

If T(n)="spaced", the prototype for W signal can be created as follows $$W_{proto}(b, n) = \frac{S_0(b, n) + S_1(b, n)}{2},$$
$$0 \le b \le B_3$$
$$W_{proto}(b, n) = S_0(b, n),$$
$$b > B_3$$

In practice, $W_{proto}$ (b,n) can be created as a mean of transport audio signals at low frequencies, where the signals are roughly in phase and no comb filtering takes place, and by selecting one of the channels at high frequencies. The value of $B_3$ depends on the T/F transform and the distance between the microphones. If the distance is not known, some default value may be used (for example a value corresponding to 1 kHz).

If T(n)="downmix" or T(n)="coincident", the prototype for W signal can be created as follows $$W_{proto}(b,n)=S_0(b,n)+S_1(b,n)$$

$W_{proto}$(b,n) is created by summing the transport audio signals, since it can be assumed that original audio signals typically do not have significant delays between them with these signal types.

With respect to the Y prototype signals

If T(n)="spaced", the prototype for Y signal can be created as follows $$Y_{proto}(b, n) = \frac{S_0(b, n) + S_1(b, n)}{2},$$
$$0 \le b \le B_4$$
$$Y_{proto}(b, n) = -i(S_0(b, n) - S_1(b, n))g_{eq}(b),$$
$$B_4 < b \le B_5$$
$$Y_{proto}(b, n) = S_0(b, n),$$
$$b > B_5$$

At mid frequencies (between $B_4$ and $B_5$), a dipole signal can be created by subtracting the transport signals, shifting phase by −90 degrees, and equalizing. Hence, it serves as a good prototype for Y signal, especially if the microphone distance is known, and thus the equalization coefficients are proper. At low and high frequencies this is not feasible, and the prototype signal is generated the same way as for the omnidirectional W signal.

If the microphone distance is accurately known, the Y prototype may be used directly for Y at those frequencies (i.e., $Y(b,n)=Y_{proto}(b,n)$). If the microphone spacing is not known, $g_{eq}(b)=1$ may be used.

The signals mixer 705 in some embodiments can apply gain processing in frequency bands, to correct the energy of the $W_{proto}$ (b n) in frequency bands to a target energy in frequency bands, with potential gain smoothing. The target energy of the omnidirectional signal in a frequency band could be the sum of the transport audio signal energies in that frequency band. The result of this processing is the omnidirectional signal W(b,n).

With respect to the Y signals where the $Y_{proto}$(b,n) cannot be used directly for Y(b,n) and when the frequency is between between $B_4$ and $B_5$, adaptive gain processing is performed. The case is similar to the omnidirectional W case above: The prototype signal is already an Y-dipole except for a potentially wrong spectrum, and the signal mixer performs gain processing of the prototype signal in frequency bands. (Additionally with respect to the Y signal decorrelation is not necessary in this particular context). The gain processing may refer to using the spatial metadata (directions, ratios, other parameters) and an overall signal energy estimate (e.g. sum of the transport signal energies) in frequency bands to determine what the energy of the Y-component should be in frequency bands, and then correcting with gains the energy of the prototype signal in frequency bands to that determined energy, and the result is then the output Y(b,n).

The aforementioned procedure to generate Y(b,n) is not valid for all frequencies at this present context of T(n)="spaced". The signals mixer and decorrelator are differently configured depending on the frequency with this transport signal type, because the prototype signal is different in different frequencies. To illustrate the differing kind of the prototype signal, one can consider a scenario where a sound arrives from the negative gain direction of the Y dipole (it has a positive and a negative lobe). At mid frequencies (between $B_4$ and $B_5$) the phase of the Y prototype signal is opposite to the phase of the W prototype signal, as it should be for that direction of the arriving sound. At the other frequencies (below $B_4$ and above $B_5$) the phase of the prototype Y signals is the same as the phase of the W prototype signal. The synthesis of the appropriate phase (and energy and correlation) will be then accounted for by the signals mixer and decorrelator at those frequencies.

At low frequencies (below $B_4$), where the wavelength is large, the phase difference between audio signals captured with spaced microphones (that are typically somewhat close to each other) is small. Thus the prototype signals creator should not be configured to generate the prototype signal in the same manner as frequencies between $B_4$ and $B_5$ due to SNR reasons. Thus, typically the channel-sum omnidirectional signal is used instead as the prototype signal. At high frequencies (above $B_5$), where the wavelength is small, the spatial aliasing distorts the beam patterns severely (if a method like in frequencies between $B_4$ and $B_5$ is used), so there it is better to use the channel-select omnidirectional prototype signal.

The configuration of the signal mixer and decorrelator at these frequencies (below $B_4$ or above $B_5$) are next described. For a simple example the spatial metadata parameter set consists of the azimuth θ and the ratio r in frequency bands. A gain sin(θ)sqrt(r) is applied to the prototype signal within the signals mixer to generate the Y-dipole signal, and the result is the coherent part signal. The prototype signal is also decorrelated (in the decorrelator) and the decorrelated result is received in the signals mixer, where it is multiplied with a factor sqrt(1−r)$g_{order}$, and the result is the incoherent part signal. The gain $g_{order}$ is the diffuse field gain at that spherical harmonic order according to the known SN3D normalization scheme. For example, for $1^{st}$ order (as it is in this case of Y dipole) it is sqrt(⅓), for $2^{nd}$ order it is sqrt(⅕), for $3^{rd}$ sqrt(1/7), and so forth. The coherent part signal and incoherent part signals are added together. The result is the synthesized Y signal, except for a potentially wrong energy due to the potentially wrong prototype signal energy. The same energy correction procedures in frequency bands as described in context of mid frequencies (between $B_4$ and $B_5$) can be applied to correct the energy in frequency bands to the desired target, and the output is the signal Y(b,n).

For other spherical harmonics, such as X and Z components, or $2^{nd}$ or higher order components, the above described procedures can be applied, except that the gain with respect to azimuth (and other potential parameters) depends on which spherical harmonic signal is being synthesized. For example the gain to generate for X dipole coherent part from W prototype is cos(θ)sqrt(r). The decorrelation, ratio-processing, and the energy correction can be the same as above determined for Y component for other than frequencies between $B_4$ and $B_5$.

Other parameters such as elevation, spread coherence and surround coherence can be taken into account in the above procedures. A spread coherence parameter may have values from 0 to 1. A spread coherence value of 0 denotes a point source, in other words, when reproducing the audio signal using a multi-loudspeaker system the sound should be reproduced with as few loudspeakers as possible (for example only a centre loudspeaker when the direction is central). As the value of the spread coherence increases, more energy is spread to the other loudspeakers around the centre loudspeaker until at the value 0.5, the energy is evenly spread among the centre and neighbouring loudspeakers. As the value of spread coherence increases over 0.5, the energy in the centre loudspeaker is decreased until at the value 1, there is no energy in the centre loudspeaker, and all the energy is in neighbouring loudspeakers. The surrounding coherence parameter has values from 0 to 1. A value of 1 means that there is coherence between all (or nearly all) loudspeaker channels. A value of 0 means that there is no coherence between all (or even nearly all) loudspeaker channels. This is further explained in GB application No 1718341.9 add PCT application PCT/FI2018/050788.

For example, increased surround coherence can be implemented by decreased synthesized ambience energy in the spherical harmonic components, and elevation can be added by adding elevation-related gains according to the definition of Ambisonic patterns at the generation of the coherent part.

If T(n)="downmix" or T(n)="coincident", the prototype for Y signal can be created as follows:

$$Y_{proto}(b,n)=S_0(b,n)-S_1(b,n).$$

In this situation, there is no need for the phase shift, since it can be assumed that original audio signals typically do not have significant delays between them with these signal types. Regarding the "mix signals" block, if T(n)="coincident", the Y and W prototype may be used directly for Y and W outputs, possibly after gaining (depending on the actual directional patterns). If T(n)="downmix", the $Y_{proto}$(b,n) and $W_{proto}$ (b,n) cannot be used directly for Y(b,n) and W(b,n), but energy correction in frequency bands to the desired target as determined for the case T(n)="spaced" may be needed (Note that the omnidirectional component has a spatial gain 1 regardless of the arriving sound angle).

For other spherical harmonics (such as X and Z), it is not possible to create prototypes that replicate the target signal well, because the typical downmix signals are oriented on the left-right axis rather than the front back X-axis or top-bottom Z axis. Hence, in some embodiments the approach is to utilize the prototype of the omnidirectional signal, for example, $$X_{proto}(b,n)=W_{proto}(b,n)$$

$$Z_{proto}(b,n)=W_{proto}(b,n)$$

Similarly, the $W_{proto}$(b,n) is also used for higher-order harmonics due to the same reasons. The signals mixer and decorrelator in such situations can process the signals in the same manner as for T(n)="spaced" for these spherical harmonic components.

In some cases, the transport audio signal type T(n) may change during the audio playback (for example due to actual change in signal type, or imperfections in the automatic type detection). In order to avoid artefacts due to abruptly changing type, the prototype signals in some embodiments may be interpolated. This may, for example, be implemented by simply linearly interpolating from the prototype signals according to the old type to the prototype signals according to the new type.

The output of the signals mixer are the resulting time-frequency domain Ambisonic signals, which are forwarded to an inverse T/F transformer 707.

In some embodiments the MASA to Ambisonic signals converter 203 comprises an inverse T/F transformer 707 configured to convert the signals to time domain. The time-domain Ambisonic signals 906 are the output from the MASA to Ambisonic signals converter.

Figure 8:
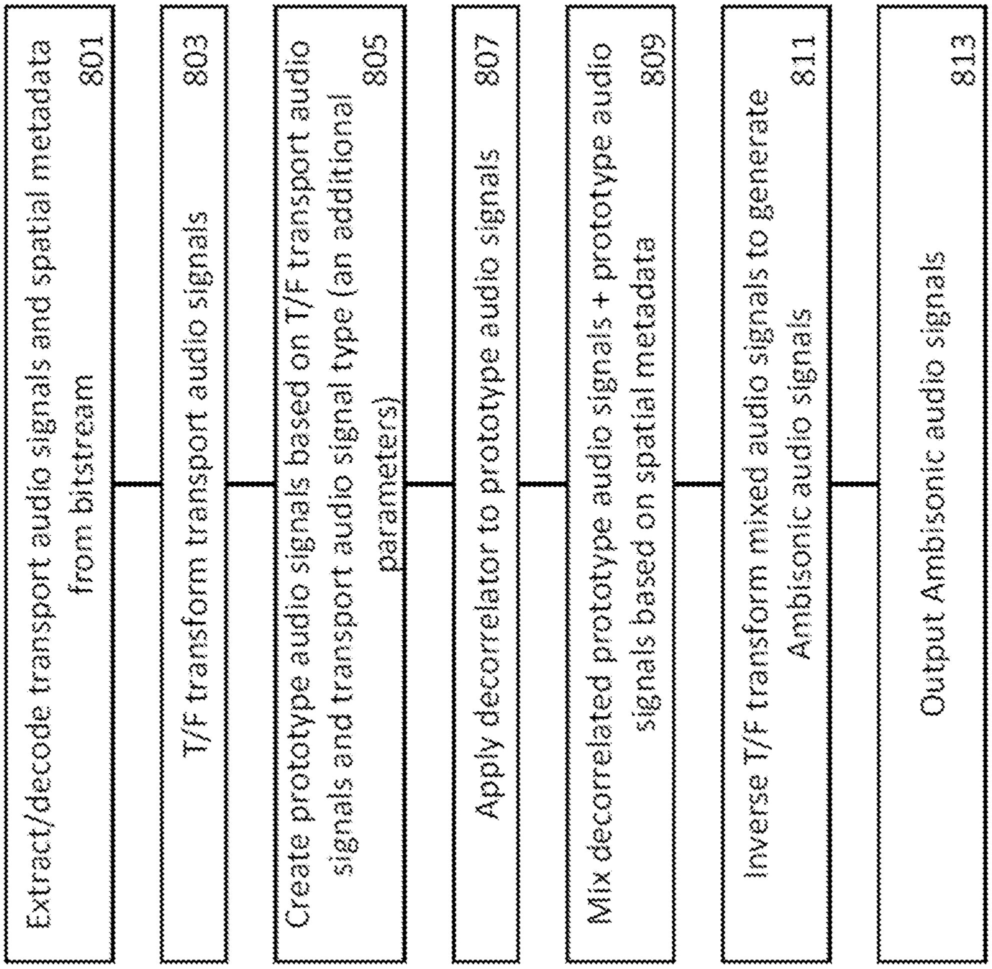
FIG. 8 shows a flow diagram of the operation of the example metadata assisted spatial audio signal to ambisonics format converter according to some embodiments.

With respect to FIG. 8 is shown a summary of the operations of the apparatus shown in FIG. 7.

Thus in some embodiments the first operation is that of extracting and/or decoding the transport audio signals and metadata from the MASA stream (or bitstream) as shown in FIG. 8 by step 801.

The next operation may be time-frequency domain transform the transport audio signals as shown in FIG. 8 by step 803.

Then the method comprises creating prototype audio signals based on the time-frequency domain transport signals and further based the transport audio signal type (and further based on the additional parameters) as shown in FIG. 8 by step 805.

In some embodiments the method comprises applying a decorrelation on the time-frequency prototype audio signals as shown in FIG. 8 by step 807.

Then the decorrelated time-frequency prototype audio signals and time-frequency prototype audio signals can be mixed based on the spatial metadata and the transport audio signal type as shown in FIG. 8 by step 809.

The mixed signals may then be inverse time-frequency transformed as shown in FIG. 8 by step 811.

Then the time domain signals can be output as shown in FIG. 8 by step 813.

Figure 9:
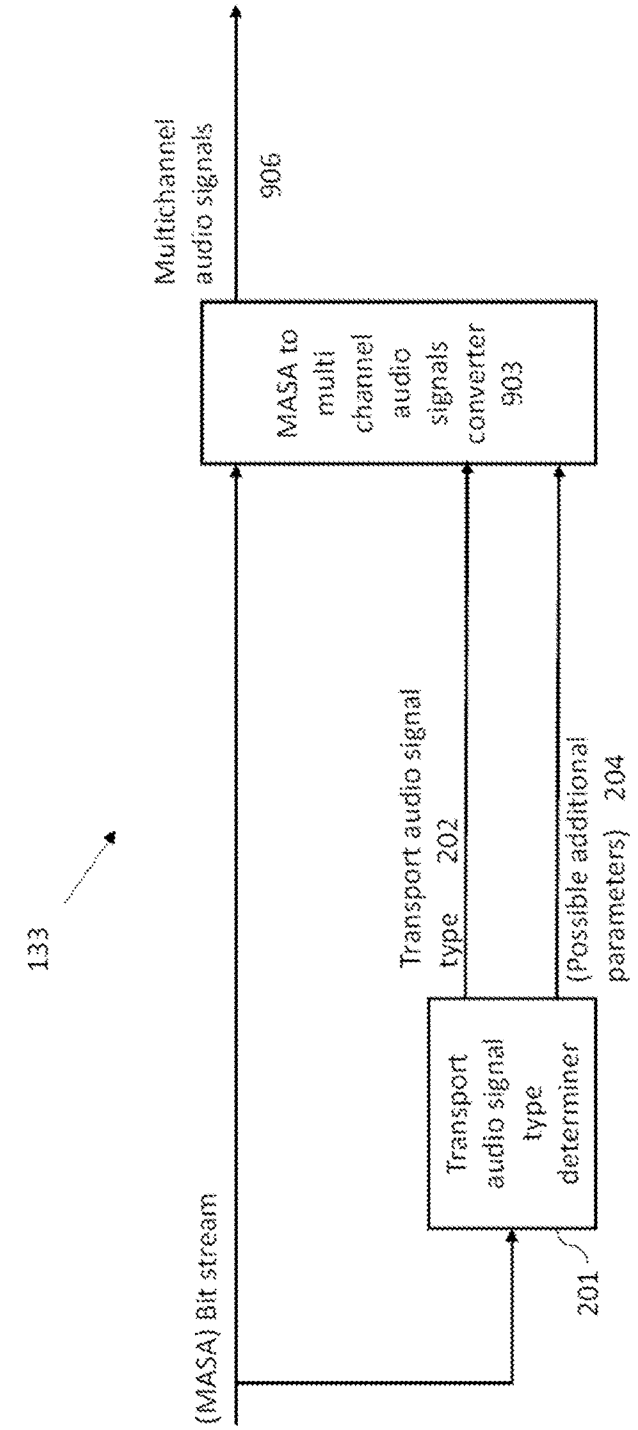
FIG. 9 shows schematically a second example decoder/renderer according to some embodiments.

FIG. 9 shows a schematic view of an example decoder suitable for implementing some embodiments. The example embodiment could for example be implemented within example 'demultiplexer/decoder/synthesizer' block 133 shown in FIG. 1. In this example, the input is a metadata assisted spatial audio (MASA) stream containing two audio channels and spatial metadata. However as discussed herein the input format may be any suitable metadata assisted spatial audio format.

The (MASA) bitstream is forwarded to a transport audio signal type determiner 201. The transport audio signal type determiner 201 is configured to determine the transport audio signal type 202, and possibly some additional parameters 204 (such as microphone distance) based on the bitstream. The determined parameters are forwarded to a MASA to multichannel audio signals converter 903. The transport audio signal type determiner 201 in some embodiments is the same transport audio signal type determiner 201 as described above with respect to FIG. 2 or may be a separate instance of the transport audio signal type determiner 201 configured to operate in a manner similar to the transport audio signal type determiner 201 as described above with respect to the example shown in FIG. 2.

The MASA to multichannel audio signals converter 903 is configured to receive the bitstream and the transport audio signal type 202 (and possibly some additional parameters 204) and is configured to convert the MASA stream to multichannel audio signals (such as 5.1) based on the determined transport audio signal type 202 (and possible additional parameters 204).

Figure 10:
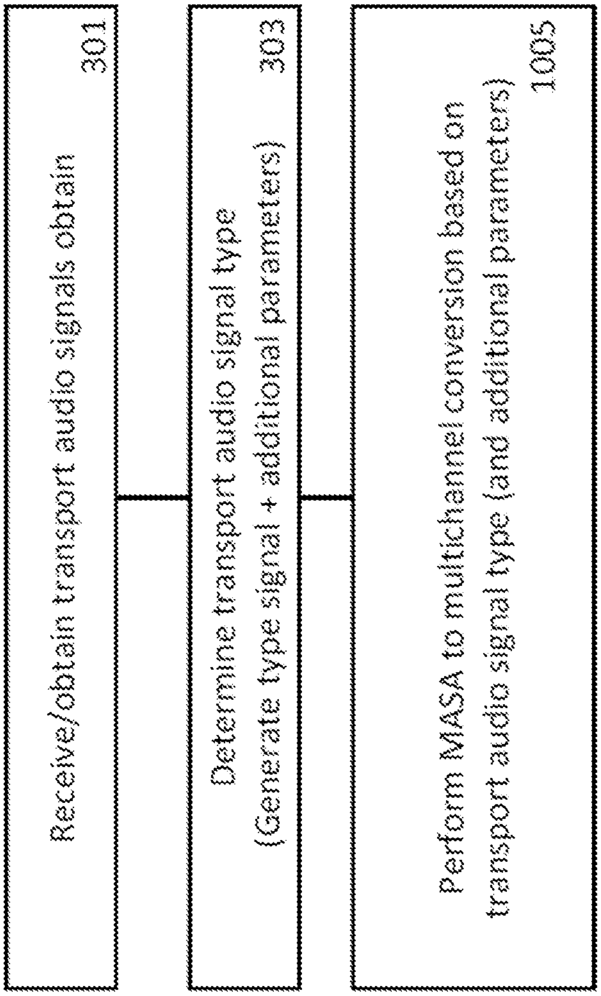
FIG. 10 shows a flow diagram of the operation of the further example decoder/renderer according to some embodiments.

The operation of the example shown in FIG. 9 is summarised in the flow-diagram shown in FIG. 10.

The first operation is one of receiving or obtaining the bitstream (the MASA stream) as shown in FIG. 10 by step 301.

The following operation is one of determining the transport audio signal type based on the bitstream (and generating a type signal or indicator and possible other additional parameters) as shown in FIG. 10 by step 303.

Having determined the transport audio signal type the next operation is converting the bitstream (MASA stream) to multichannel audio signals (such as 5.1) based on the determined transport audio signal type as shown in FIG. 10 by step 1005.

Figure 11:
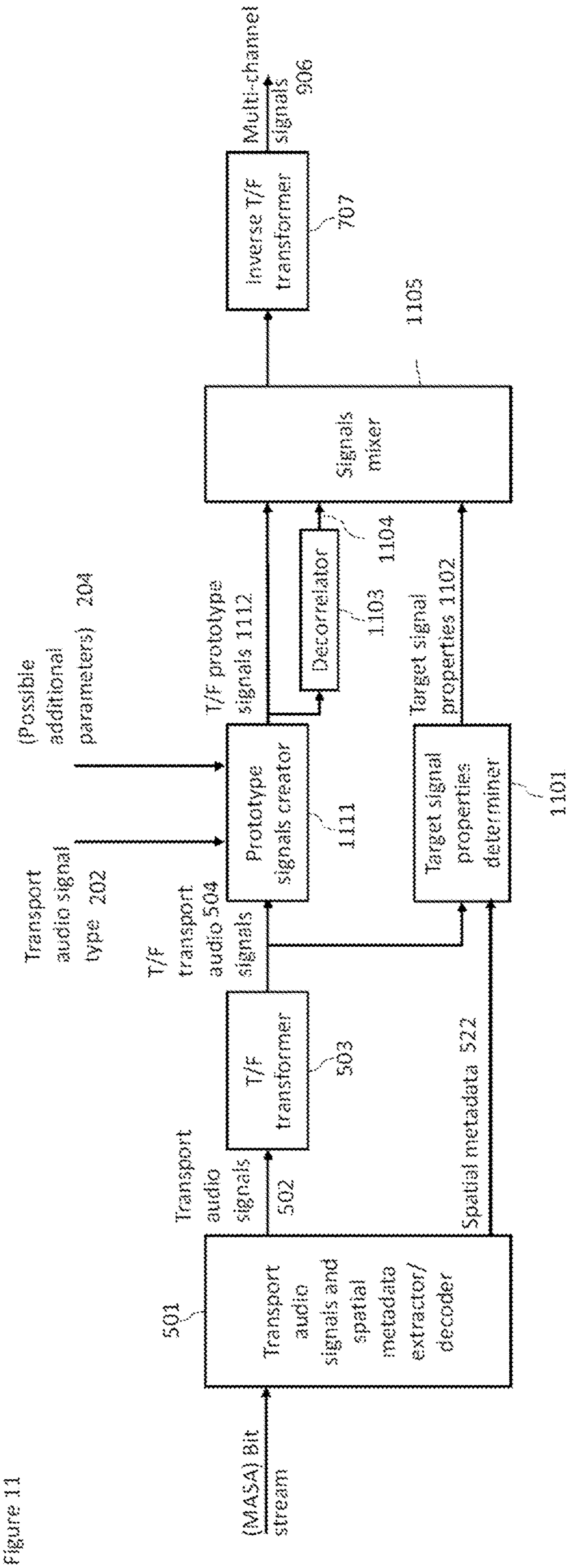
FIG. 11 shows schematically an example metadata assisted spatial audio signal to multichannel audio signals format converter as shown in FIG. 9 according to some embodiments.

FIG. 11 shows an example MASA to multichannel audio signals converter 903 in further detail. The MASA to multichannel audio signals converter 903 is configured to receive the MASA stream (bitstream) and the transport audio signal type 202 and possible additional parameters 204 and is configured to convert the MASA stream to a multichannel audio signal based on the determined transport audio signal type.

The MASA to multichannel audio signals converter 903 comprises a transport audio signal and spatial metadata extractor/decoder 501. This is configured to receive the MASA stream and output transport audio signals 502 and spatial metadata 522 in the same manner as found within the transport audio signal type determiner as shown in FIG. 5 and discussed therein. In some embodiments the extractor/decoder 501 is the extractor/decoder from the transport audio signal type determiner described earlier or a separate instance of the extractor/decoder. The resulting transport audio signals 502 can be forwarded to a time/frequency transformer 503. The resulting spatial metadata 522 furthermore can be forwarded to a target signal properties determiner 1101.

In some embodiments the MASA to multichannel audio signals converter 903 comprises a time/frequency transformer 503. The time/frequency transformer 503 is configured to receive the transport audio signals 502 and convert them to the time-frequency domain. Suitable transforms include, e.g., short-time Fourier transform (STFT) and complex-modulated quadrature mirror filterbank (QMF). The resulting signals are denoted as $S_i(b,n)$, where i is the channel index, b the frequency bin index, and n time index. In case the output of audio extraction and/or decoding is already in the time-frequency domain, this block may be omitted, or alternatively it may contain transform from one time-frequency domain representation to another time-frequency domain representation. The T/F-domain transport audio signals 504 can be forwarded to a prototype signals creator 1111. In some embodiments the time/frequency transformer 503 is the same time/frequency transformer from the transport audio signal type determiner or MASA to Ambisonics converter or a separate instance.

In some embodiments the MASA to multichannel audio signals converter 903 comprises a prototype signals creator 1111. The prototype signals creator 1111 is configured to receive the T/F-domain transport audio signals 504, the transport audio signal type 202 and the possible additional parameters 204. The T/F prototype signals 1112 may then be output to the signals mixer 1105 and the decorrelator 1103.

As an example with respect to the operation of the prototype signals creator 1111 a rendering to a 5.1 multichannel audio signal configuration is described.

In this example the prototype signal for the left-side (left front and left surround) output channels can be created as $$L_{f,proto}(b,n)=L_{s,proto}(b,n)=S_0(b,n)$$

and for the right-side output (right front and right surround) channels as $$R_{f,proto}(b,n)=R_{s,proto}(b,n)=S_1(b,n)$$

So, for the output channels to the either side of the median plane the prototype signals can directly utilize the corresponding transport audio signal.

For the centre output channel, the prototype audio signal should contain energy from the left and the right sides, as it may be used for panning to either sides. Thus, the prototype signal may be created equally as the omnidirectional channel in the case of Ambisonic rendering, in other words, $$C_{proto}(b,n)=\frac{S_0(b,n)+S_1(b,n)}{2},$$
$$0\le b\le B_3$$
$$C_{proto}(b,n)=S_0(b,n),$$
$$b>B_3$$

if T(n)="spaced". In some embodiments the prototype audio signals can generate a prototype centre audio channel $$C_{proto}(b,n)=S_0(b,n)+S_1(b,n)$$

if T(n)="downmix" or T(n)="coincident".

In some embodiments the MASA to multichannel audio signals converter 903 comprises a decorrelator 1103. The decorrelator 1103 is configured to receive the T/F prototype signals 1112 and apply a decorrelation and output decorrelated T/F prototype signals 1104 to the signals mixer 1105. In some embodiments the decorrelator 1103 is optional.

In some embodiments the MASA to multichannel audio signals converter 903 comprises a target signal properties determiner 1101. The target signal properties determiner 1101 in some embodiments is configured to generate a target covariance matrix (target signal properties) in frequency bands based on the spatial metadata and an overall estimate of the signal energy in frequency bands. In some embodiments this energy estimate could be the sum of the transport signal energies in frequency bands. This target covariance matrix (target signal property) determination can be performed in a manner similar to provided by patent application GB 1718341.9.

The target signal properties 1102 can then be passed to the signals mixer 1105.

In some embodiments the MASA to multichannel audio signals converter 903 comprises a signals mixer 1105. The signals mixer 1105 is configured to measure the covariance matrix of the prototype signal, and formulate a mixing solution based on that estimated (prototype signal) covariance matrix and the target covariance matrix. In some embodiments the mixing solution may be similar to that described in GB 1718341.9. The mixing solution is applied to the prototype signals and the decorrelated prototype signals, and the resulting signals have then obtained in frequency bands properties based on the target signal properties. In other words based on the determined the target covariance matrix.

In some embodiments the MASA to multichannel audio signals converter 903 comprises an inverse T/F transformer 707 configured to convert the signals to time domain. The time-domain multichannel audio signals are the output from the MASA to multichannel audio signals converter.

Figure 12:
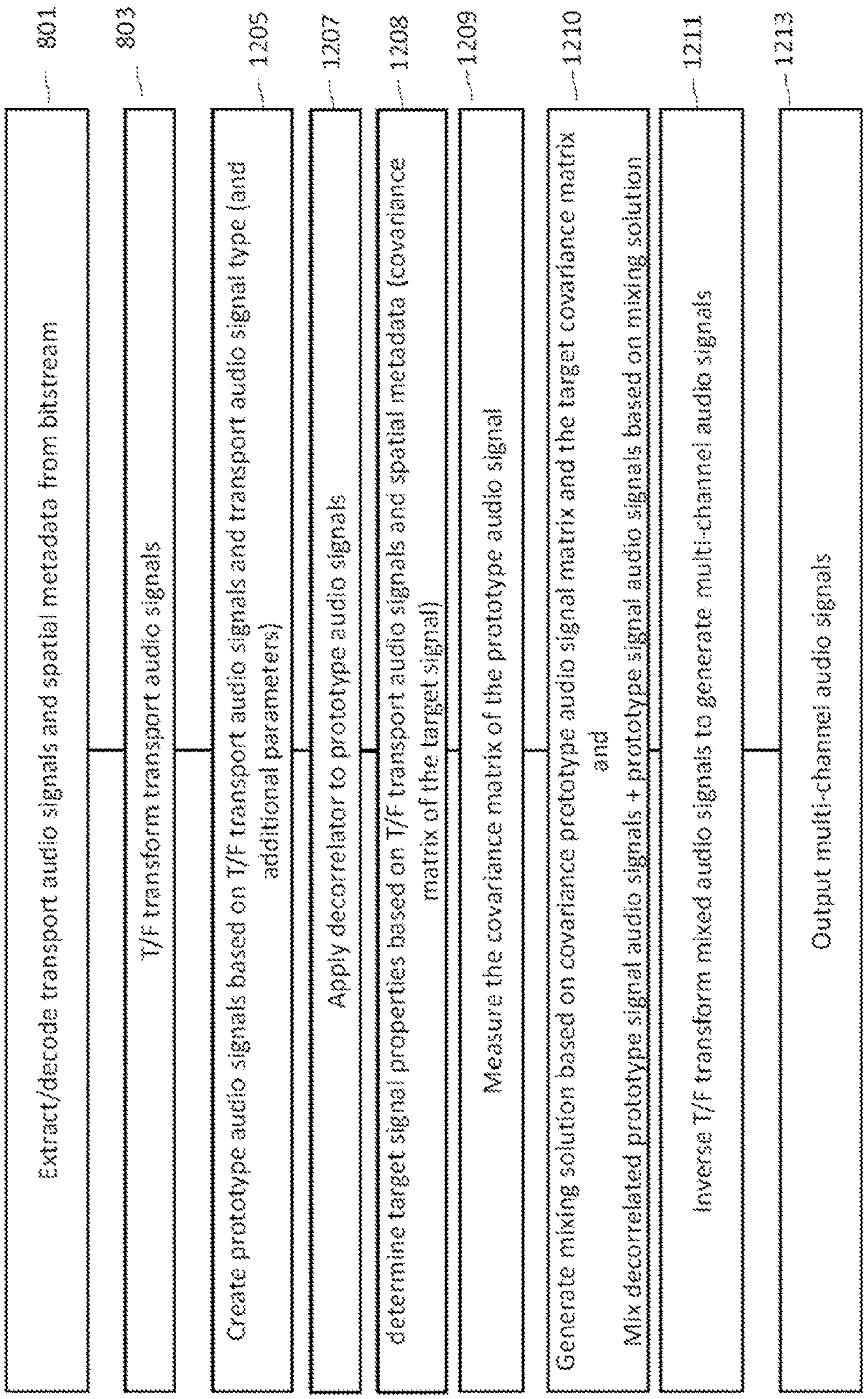
FIG. 12 shows a flow diagram of the operation of the example metadata assisted spatial audio signal to multichannel audio signals format converter according to some embodiments.

With respect to FIG. 12 is shown a summary of the operations of the apparatus shown in FIG. 11.

Thus in some embodiments the first operation is that of extracting and/or decoding the transport audio signals and metadata from the MASA stream (or bitstream) as shown in FIG. 12 by step 801.

The next operation may be time-frequency domain transform the transport audio signals as shown in FIG. 12 by step 803.

Then the method comprises creating prototype audio signals based on the time-frequency domain transport signals and further based the transport audio signal type (and further based on the additional parameters) as shown in FIG. 12 by step 1205.

In some embodiments the method comprises applying a decorrelation on the time-frequency prototype audio signals as shown in FIG. 12 by step 1207.

Then target signal properties can be determined based on the time-frequency domain transport audio signals and the spatial metadata (to generate a covariance matrix of the target signal) as shown in FIG. 12 by step 1208.

The covariance matrix of the prototype audio signals can be measured as shown in FIG. 12 by step 1209.

Then the decorrelated time-frequency prototype audio signals and time-frequency prototype audio signals can be mixed based on the target signal properties as shown in FIG. 12 by step 1209.

The mixed signals may then be inverse time-frequency transformed as shown in FIG. 12 by step 1211.

Then the time domain signals can be output as shown in FIG. 12 by step 1213.

Figure 13:
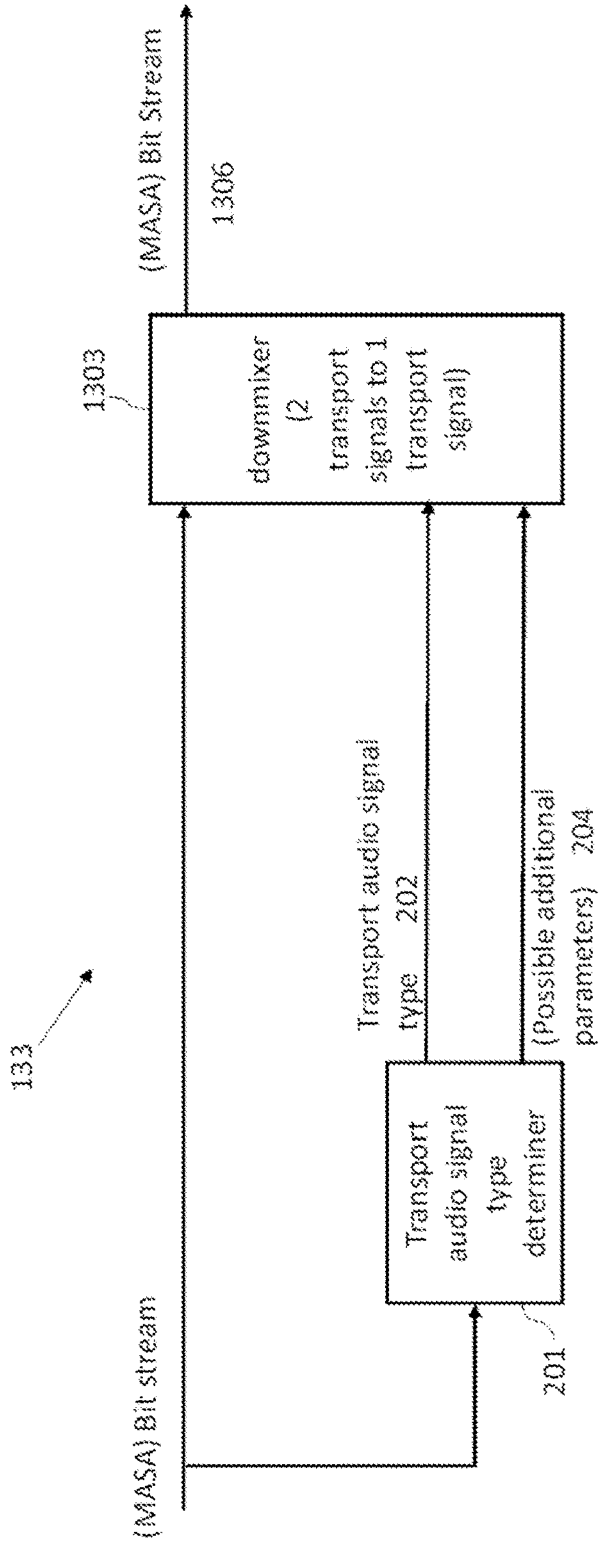
FIG. 13 shows schematically a third example decoder/renderer according to some embodiments.

FIG. 13 shows a schematic view of a further example decoder suitable for implementing some embodiments. In other embodiments similar methods may be implemented in apparatus other than decoders, for example as a part of an encoder. The example embodiment could for example be implemented within an (IVAS) 'demultiplexer/decoder/synthesizer' block 133 such as shown in FIG. 1. In this example, the input is a metadata assisted spatial audio (MASA) stream containing two audio channels and spatial metadata. However as discussed herein the input format may be any suitable metadata assisted spatial audio format.

The (MASA) bitstream is forwarded to a transport audio signal type determiner 201. The transport audio signal type determiner 201 is configured to determine the transport audio signal type 202, and possibly some additional parameters 204 (an example of such additional parameters is microphone distance) based on the bitstream. The determined parameters are forwarded to a downmixer 1303. The transport audio signal type determiner 201 in some embodiments is the same transport audio signal type determiner 201 as described above or may be a separate instance of the transport audio signal type determiner 201 configured to operate in a manner similar to the transport audio signal type determiner 201 as described above.

The downmixer 1303 is configured to receive the bitstream and the transport audio signal type 202 (and possibly some additional parameters 204) and is configured to downmix the MASA stream from 2 transport audio signals to 1 transport audio signal based on the determined transport audio signal type 202 (and possible additional parameters 204). The output MASA stream 1306 is then output.

Figure 14:
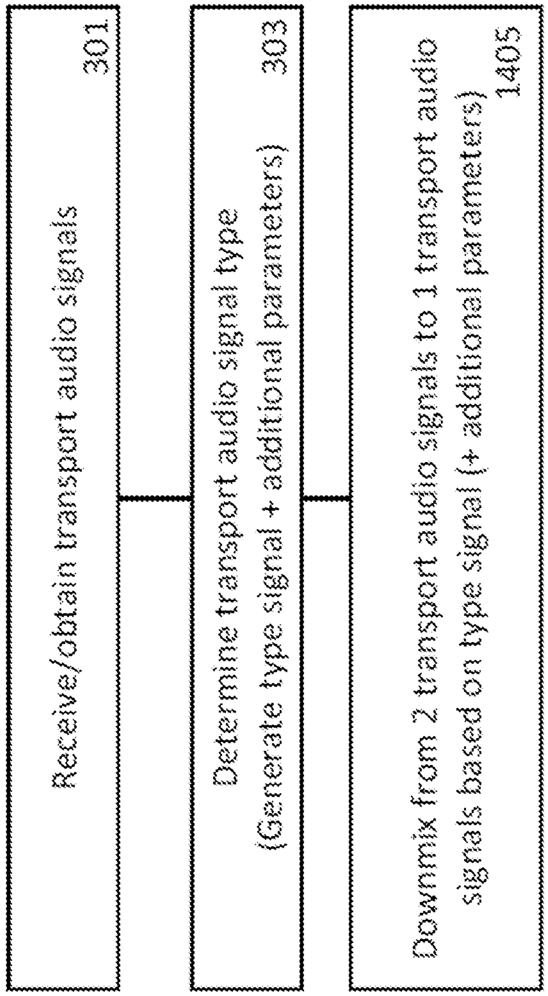
FIG. 14 shows a flow diagram of the operation of the third example decoder/renderer according to some embodiments.

The operation of the example shown in FIG. 13 is summarised in the flow-diagram shown in FIG. 14.

The first operation is one of receiving or obtaining the bitstream (the MASA stream) as shown in FIG. 14 by step 301.

The following operation is one of determining the transport audio signal type based on the bitstream (and generating a type signal or indicator and possible other additional parameters) as shown in FIG. 14 by step 303.

Having determined the transport audio signal type the next operation is downmix the MASA stream from 2 transport audio signals to 1 transport audio signal based on the determined transport audio signal type 202 (and possible additional parameters 204) as shown in FIG. 14 by step 1405.

Figure 15:
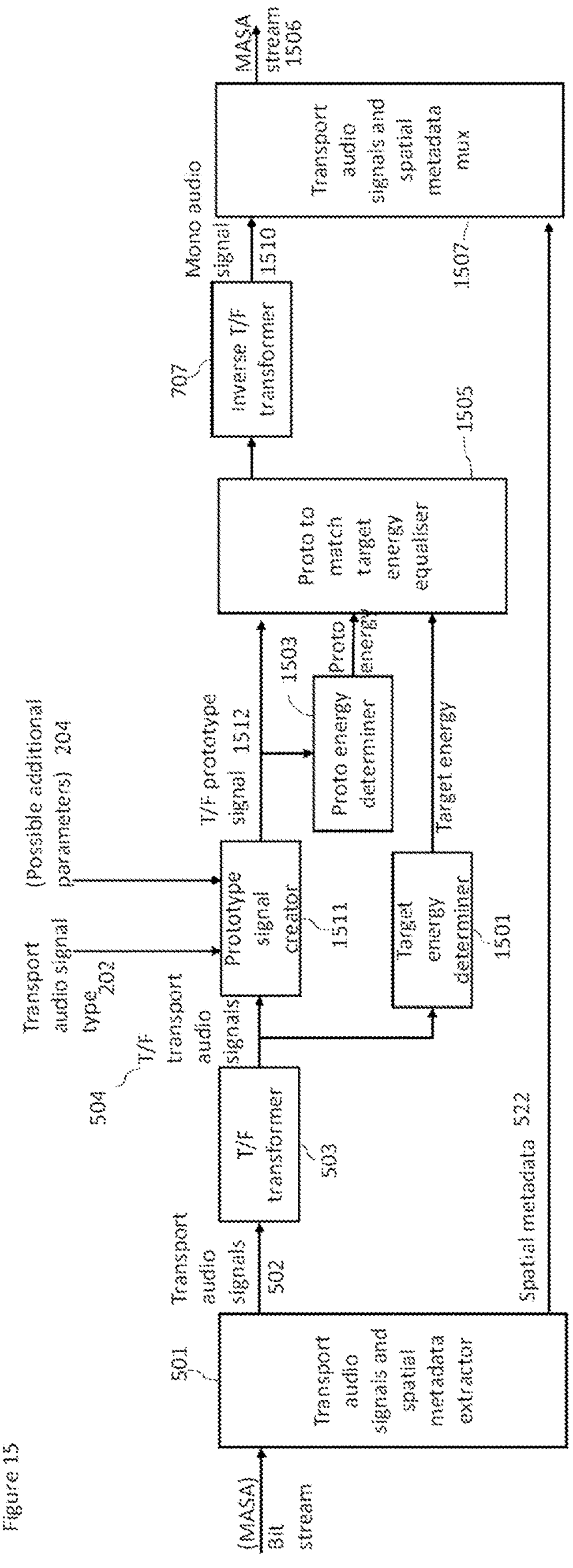
FIG. 15 shows schematically an example metadata assisted spatial audio signal downmixer as shown in FIG. 13 according to some embodiments.

FIG. 15 shows an example downmixer 1303 in further detail. The downmixer 1303 is configured to receive the MASA stream (bitstream) and the transport audio signal type 202 and possible additional parameters 204 and is configured to downmix the two transport audio signals to one transport audio signal based on the determined transport audio signal type.

The downmixer 1303 comprises a transport audio signal and spatial metadata extractor/decoder 501. This is configured to receive the MASA stream and output transport audio signals 502 and spatial metadata 522 in the same manner as found within the transport audio signal type determiner as discussed therein. In some embodiments the extractor/decoder 501 is the extractor/decoder described earlier or a separate instance of the extractor/decoder. The resulting transport audio signals 502 can be forwarded to a time/frequency transformer 503. The resulting spatial metadata 522 furthermore can be forwarded to a signals multiplexer 1507.

In some embodiments the downmixer 1303 comprises a time/frequency transformer 503. The time/frequency transformer 503 is configured to receive the transport audio signals 502 and convert them to the time-frequency domain. Suitable transforms include, e.g., short-time Fourier transform (STFT) and complex-modulated quadrature mirror filterbank (QMF). The resulting signals are denoted as $S_i(b,n)$, where i is the channel index, b the frequency bin index, and n time index. In case the output of audio extraction and/or decoding is already in the time-frequency domain, this block may be omitted, or alternatively it may contain transform from one time-frequency domain representation to another time-frequency domain representation. The T/F-domain transport audio signals 504 can be forwarded to a prototype signals creator 1511. In some embodiments the time/frequency transformer 503 is the same time/frequency transformer as described earlier or a separate instance.

In some embodiments the downmixer 1303 comprises a prototype signals creator 1511. The prototype signals creator 1511 is configured to receive the T/F-domain transport audio signals 504, the transport audio signal type 202 and the possible additional parameters 204. The T/F prototype signals 1512 may then be output to a proto energy determiner 1503 and proto to match target energy equaliser 1505.

The prototype signals creator 1511 in some embodiments is configured to create a prototype signal for a mono transport audio signal using the two transport audio signals, based on the received transport audio signal type. For example the following may be used.

If T(n)="spaced", $$M_{proto}(b,n)=S_0(b,n).$$

If T(n)="downmix" or T(n)="coincident", $$M_{proto}(b,n)=S_0(b,n)+S_1(b,n).$$

In some embodiments the downmixer 1303 comprises a target energy determiner 1501. The target energy determiner 1501 is configured to receive the T/F-domain transport audio signals 504 and generate a target energy value as the sum of the energies of the transport audio signals $$E_{target}(b,n)=|S_0(b,n)|^2+|S_1(b,n)|^2.$$

The target energy values can then be passed to the proto to match target equaliser 1505.

In some embodiments the downmixer 1303 comprises a proto energy determiner 1503. The proto energy determiner 1503 is configured to receive the T/F prototype signals 1512 and determine energy values, for example, as $$E_{proto}(b,n)=|M_{proto}(b,n)|^2.$$

The proto energy values can then be passed to the proto to match target equaliser 1505.

The downmixer 1303 in some embodiments comprises a proto to match target energy equaliser 1505. The proto to match target energy equaliser 1505 in some embodiments is configured to receive the T/F prototype signals 1502, the proto energy values and the target energy values. The equaliser 1505 in some embodiments is configured to first smooth the energies over time, for example using the following $$E_x'(b,n)=a_5E_x(b,n)+b_5E_x'(b,n-1)$$

where $a_5$ and $b_5$ are smoothing coefficients (e.g., $a_5$=0.1 and $b_5=1-a_5$). Then, the equaliser 1505 is configured to determine equalization gains as $$g_{eq}(b,n)=\sqrt{\frac{E'_{target}(b,n)}{E'_{proto}(b,n)}}.$$

The prototype signals can then be equalized using these gains such as $$M(b,n)=g_{eq}(b,n)M_{proto}(b,n),$$

the equalised prototype signals being passed to an inverse T/F transformer 707.

In some embodiments the downmixer 1303 comprises an inverse T/F transformer 707 configured to convert the output of the equaliser to a time domain version. The time-domain equalised audio signals (the mono signal) 1510 is then passed to a transport audio signals and spatial metadata multiplexer 1507 (or multiplexer).

In some embodiments the downmixer 1303 comprises a transport audio signals and spatial metadata multiplexer 1507 (or multiplexer). The transport audio signals and spatial metadata multiplexer 1507 (or multiplexer) is configured to receive the spatial metadata 522 and the mono audio signal 1510 and multiplex them to regenerate a suitable output format (for example a MASA stream that has only one transport audio signal) 1506. In some embodiments the input mono audio signal is in a pulse code modulated (PCM) form. In such embodiments the signals may be encoded as well as multiplexed. In some embodiments, the multiplexing may be omitted, and the mono transport audio signal and the spatial metadata are directly used in an audio encoder.

In some embodiments the output of the apparatus shown in FIG. 15 is a mono PCM audio signal 1510 where the spatial metadata is discarded.

In some embodiments there could be implemented the other parameters, for example in some embodiments there may be estimated a spaced microphone distance when the type is "spaced".

Figure 16:
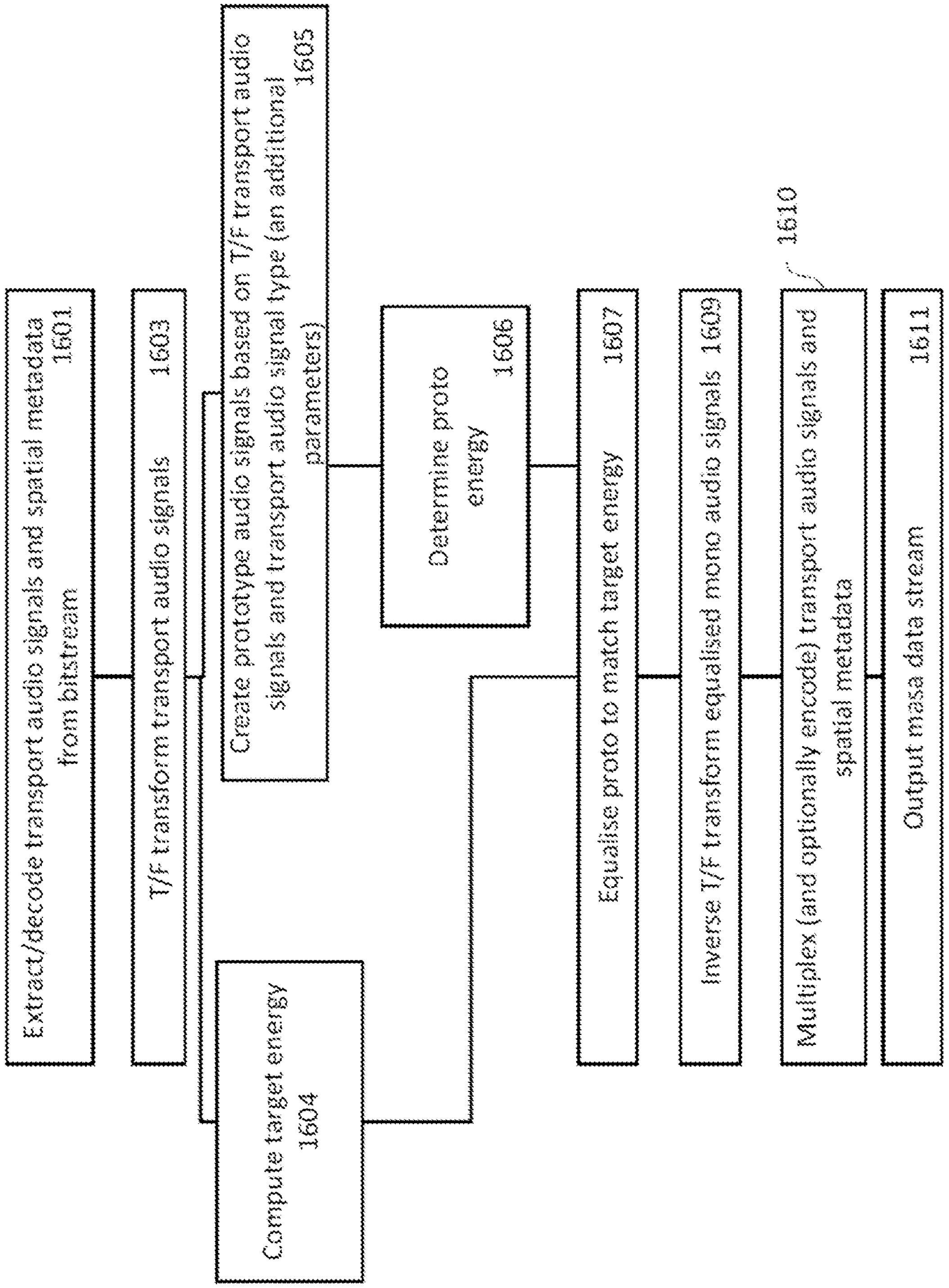
FIG. 16 shows a flow diagram of the operation of the example metadata assisted spatial audio signal downmixer according to some embodiments.

With respect to FIG. 16 is shown an example operation of the apparatus shown in FIG. 15.

Thus in some embodiments the first operation is that of extracting and/or decoding the transport audio signals and metadata from the MASA stream (or bitstream) as shown in FIG. 16 by step 1601.

The next operation may be time-frequency domain transform of the transport audio signals as shown in FIG. 16 by step 1603.

Then the method comprises creating prototype audio signals based on the time-frequency domain transport signals and further based the transport audio signal type (and further based on the additional parameters) as shown in FIG. 16 by step 1605.

The method furthermore in some embodiments is configured to generate, determine or compute a target energy value based on the transformed transport audio signals as shown in FIG. 16 by step 1604.

The method furthermore in some embodiments is configured to generate, determine or compute a prototype audio signal energy value based on the prototype audio signals as shown in FIG. 16 by step 1606.

Having determined the energies the method may further equalise the prototype audio signals to match the target audio signal energy as shown in FIG. 16 by step 1607.

The equalised prototype signals (the mono signals) may then be inverse time-frequency domain transformed to generate time domain mono signals as shown in FIG. 16 by step 1609.

The time domain mono audio signals may then be (optionally encoded and) multiplexed with the spatial metadata as shown in FIG. 16 by step 1610.

The multiplexed audio signals may then be output (as a MASA datastream) as shown in FIG. 16 by step 1611.

As mentioned above the block diagrams shown are merely one example of the possible implementations. Other practical implementations may differ from the above example. For example an implementation may not have separate T/F transformers.

Furthermore in some embodiments rather than having input MASA streams as shown above any suitable bitstream utilizing audio channels and (spatial) metadata can be used. Furthermore in some embodiments the IVAS codec can be replaced by any other suitable codec (for example one that has an operating mode of audio channels and spatial metadata).

In some embodiments other parameters than just the transport audio signal type could be estimated using the transport audio signal type determiner. For example the spacing of the microphones could be estimated. The spacing of the microphones could be an example of the possible additional parameters 204. This could be implemented in some embodiments by inspecting the frequencies of local maxima and minima of $E_{sum}(b,n)$ and $E_{sub}(b,n)$, determining the time delay between the microphones based on those, and estimating the spacing based on the delay and the estimated direction of arrival (available in the spatial metadata). There are also other methods for estimating delays between two signals.

Figure 17:
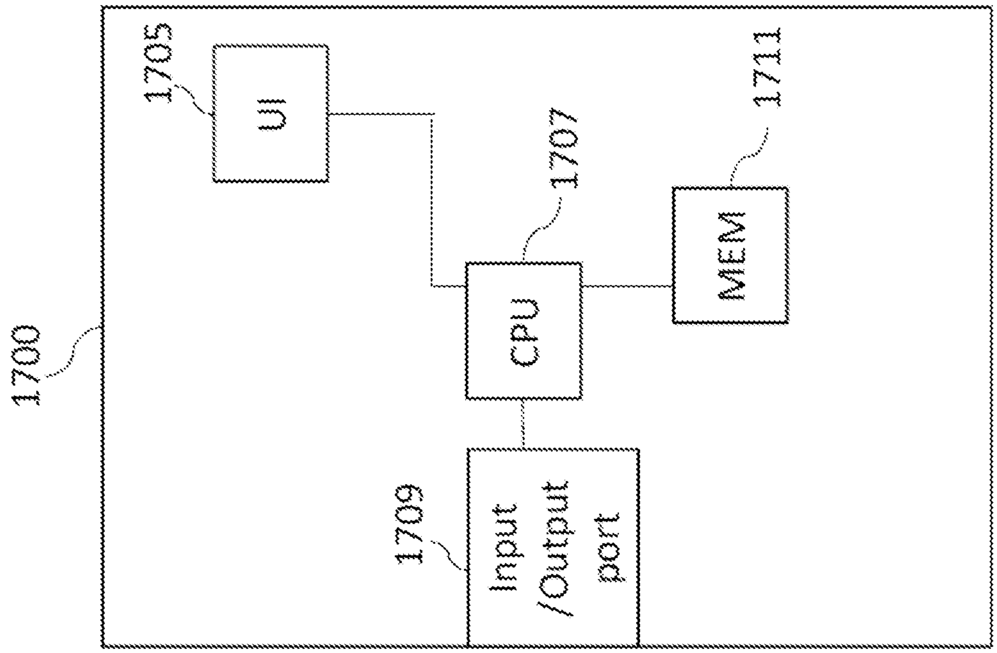
FIG. 17 shows an example device suitable for implementing the apparatus shown in FIGS. 1, 2, 4, 5, 7, 9, 11, 13 and 15.

With respect to FIG. 17 an example electronic device which may be used as the analysis or synthesis device is shown. The device may be any suitable electronics device or apparatus. For example in some embodiments the device 1700 is a mobile device, user equipment, tablet computer, computer, audio playback apparatus, etc.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating with the position determiner as described herein.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals and in some embodiments determine the parameters as described herein by using the processor 1707 executing suitable code.

In some embodiments the device 1700 may be employed as at least part of the synthesis device. The input/output port 1709 may be coupled to any suitable audio output for example to a multichannel speaker system and/or headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
at least one processor; and
at least one non-transitory memory including a computer program code, the at least one memory and the computer program code configured to, with the at least one processor, cause the apparatus at least to:
obtain at least two audio signals;
obtain at least one parameter associated with the at least two audio signals;
determine a type of the at least two audio signals based, at least partially, on the at least one parameter; and
process the at least two audio signals for rendering based, at least partially, on the determined type of the at least two audio signals.

2. The apparatus as claimed in claim 1, wherein the at least two audio signals are at least one of:
transport audio signals; or
previously processed audio signals.

3. The apparatus as claimed in claim 1, wherein determining the type of the at least two audio signals comprises the at least one memory and the computer program code are configured to, with the at least one processor, cause the apparatus to one of:
extract and decode at least one type indicator from the at least one parameter; or
in response to the at least one parameter representing a spatial audio aspect associated with the at least two audio signals, analyse the at least one parameter to determine the type of the at least two audio signals.

4. The apparatus as claimed in claim 3, wherein analysing the at least one parameter to determine the type of the at least two audio signals comprises the at least one memory and the computer program code are configured to, with the at least one processor, cause the apparatus to:
determine a broadband left or right channel to total energy ratio based on the at least two audio signals;
determine a higher frequency left or right channel to total energy ratio based on the at least two audio signals;
determine a sum to total energy ratio based on the at least two audio signals;
determine a subtract to target energy ratio based on the at least two audio signals; and
determine the type of the at least two audio signals based on at least one of:
the broadband left or right channel to total energy ratio;
the higher frequency left or right channel to total energy ratio based on the at least two audio signals;
the sum to total energy ratio based on the at least two audio signals; or
the subtract to target energy ratio.

5. The apparatus as claimed in claim 1, wherein the at least one memory and the computer program code are configured to, with the at least one processor, cause the apparatus to determine at least one type parameter associated with the type of the at least two audio signals.

6. The apparatus as claimed in claim 5, wherein processing the at least two audio signals for rendering comprises the at least one memory and the computer program code are configured to, with the at least one processor, cause the apparatus to convert the at least two audio signals based on the at least one type parameter associated with the type of the at least two audio signals.

7. The apparatus as claimed in claim 1, wherein the type of the at least two audio signals comprises at least one of:
a capture microphone arrangement;
a capture microphone separation distance;
a capture microphone parameter;
a transport channel identifier;
a spaced audio signal type;
a downmix audio signal type;
a coincident audio signal type; or
a transport channel arrangement.

8. The apparatus as claimed in claim 1, wherein processing the at least two audio signals for rendering comprises the at least one memory and the computer program code are configured to, with the at least one processor, cause the apparatus to at least one of:

convert the at least two audio signals into an ambisonic audio signal representation;

convert the at least two audio signals into a multichannel audio signal representation; or downmix the at least two audio signals into fewer audio signals.

9. The apparatus as claimed in claim 1, wherein the at least one memory and the computer program code are configured to, with the at least one processor, cause the apparatus to generate at least one prototype signal based on the at least two audio signals and the type of the at least two audio signals.

10. A method comprising:

obtaining at least two audio signals;

obtaining at least one parameter associated with the at least two audio signals;

determining a type of the at least two audio signals based, at least partially, on the at least one parameter; and processing the at least two audio signals for rendering based, at least partially, on the determined type of the at least two audio signals.

11. The method as claimed in claim 10, wherein the at least two audio signals are at least one of:

transport audio signals; or previously processed audio signals.

12. The method as claimed in claim 10, wherein determining the type of the at least two audio signals based on the at least one parameter further comprises one of:

extracting and decoding at least one type signal from the at least one parameter; or in response to the at least one parameter representing a spatial audio aspect associated with the at least two audio signals, analysing the at least one parameter to determine the type of the at least two audio signals.

13. The method as claimed in claim 12, wherein analysing the at least one parameter to determine the type of the at least two audio signals further comprises:

determining a broadband left or right channel to total energy ratio based on the at least two audio signals;

determining a higher frequency left or right channel to total energy ratio based on the at least two audio signals;

determining a sum to total energy ratio based on the at least two audio signals;

determining a subtract to target energy ratio based on the at least two audio signals; and determining the type of the at least two audio signals based on at least one of:

the broadband left or right channel to total energy ratio;

the higher frequency left or right channel to total energy ratio based on the at least two audio signals;

the sum to total energy ratio based on the at least two audio signals; or the subtract to target energy ratio.

14. The method as claimed in claim 10, further comprises at least one of:

determining at least one type parameter associated with the type of the at least two audio signals; or processing the at least two audio signals based on the determined type of the at least two audio signals comprises converting the at least two audio signals based on the at least one type parameter associated with the type of the at least two audio signals.

15. The method as claimed in claim 10, wherein processing the at least two audio signals further comprises at least one of:

converting the at least two audio signals into an ambisonic audio signal representation;

converting the at least two audio signals into a multichannel audio signal representation; or downmixing the at least two audio signals into fewer audio signals.

16. The method as claimed in claim 10, wherein processing the at least two audio signals further comprises generating at least one prototype signal based on the at least two audio signals and the type of the at least two audio signals.

17. A non-transitory computer-readable medium comprising program instructions stored thereon for performing at least the following:

causing obtaining of at least two audio signals;

causing obtaining of at least one parameter associated with the at least two audio signals;

determining a type of the at least two audio signals based, at least partially, on the at least one parameter; and processing the at least two audio signals for rendering based, at least partially, on the determined type of the at least two audio signals.

18. The non-transitory computer-readable medium as claimed in claim 17, wherein the at least two audio signals are at least one of:

transport audio signals; or previously processed audio signals.

19. The non-transitory computer-readable medium as claimed in claim 17, wherein the program instructions stored thereon for performing determining the type of the at least two audio signals comprises program instructions for performing one of:

extracting and decoding at least one type signal from the at least one parameter; or in response to the at least one parameter representing a spatial audio aspect associated with the at least two audio signals, analysing the at least one parameter to determine the type of the at least two audio signals.

20. The non-transitory computer-readable medium as claimed in claim 19, wherein the program instructions stored thereon for performing analysing the at least one parameter to determine the type of the at least two audio signals comprises program instructions for performing one of:

determining a broadband left or right channel to total energy ratio based on the at least two audio signals;

determining a higher frequency left or right channel to total energy ratio based on the at least two audio signals;

determining a sum to total energy ratio based on the at least two audio signals;

determining a subtract to target energy ratio based on the at least two audio signals; and determining the type of the at least two audio signals based on at least one of:

the broadband left or right channel to total energy ratio;

the higher frequency left or right channel to total energy ratio based on the at least two audio signals;

the sum to total energy ratio based on the at least two audio signals; or the subtract to target energy ratio.

* * * * *